(12) United States Patent
Nagashima

(10) Patent No.: US 10,099,497 B2
(45) Date of Patent: Oct. 16, 2018

(54) INKJET PRINTER AND METHOD OF CONTROLLING INKJET PRINTING

(71) Applicant: FUJIFILM Corporation, Tokyo (JP)

(72) Inventor: Kanji Nagashima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/278,604

(22) Filed: Sep. 28, 2016

(65) Prior Publication Data

US 2017/0087910 A1  Mar. 30, 2017

(30) Foreign Application Priority Data

Sep. 29, 2015  (JP) .................................. 2015-191076

(51) Int. Cl.
*B41J 29/393* (2006.01)
*B41J 2/01* (2006.01)

(52) U.S. Cl.
CPC ............... *B41J 29/393* (2013.01); *B41J 2/01* (2013.01)

(58) Field of Classification Search
CPC . B41J 2/0451; B41J 29/393; B41J 2029/3935
See application file for complete search history.

(56) References Cited

U.S. PATENT DOCUMENTS

| 6,477,892 | B1 * | 11/2002 | Lindig .................. B41J 11/009 73/105 |
| 2005/0024659 | A1 * | 2/2005 | Yamazaki .............. G06K 15/02 358/1.9 |
| 2010/0310264 | A1 * | 12/2010 | Ishida ................ G03G 15/5029 399/45 |
| 2016/0282182 | A1 * | 9/2016 | Kanai ...................... G01J 3/26 |

FOREIGN PATENT DOCUMENTS

| JP | 2006-159602 A | 6/2006 |
| JP | 2006-164180 A | 6/2006 |
| JP | 2015-51612 A | 3/2015 |

OTHER PUBLICATIONS

Japanese Office Action dated Jun. 22, 2018 in corresponding Application No. JP 2015-191076 (with English translation).

* cited by examiner

*Primary Examiner* — Geoffrey Mruk
*Assistant Examiner* — Scott A Richmond
(74) *Attorney, Agent, or Firm* — Birch, Stewart, Kolasch & Birch, LLP

(57) ABSTRACT

An inkjet printer includes: an optical reading device that optically reads at least one of an unprinted area on a printing paper sheet, a test chart printed area on a first printing in which a test chart is printed, and an image printed area on a second printing in which an image other than a test chart is printed, and acquires image data on the read area; an abnormal noise detecting device that analyzes the acquired image data and detects abnormal noise on a surface of a printing paper sheet; and a control device that changes at least a setting related to detection of an ejection state of an inkjet head or a printing state, or a setting related to printing correction, based on a state of the detected abnormal noise.

27 Claims, 19 Drawing Sheets

INKJET PRINTER AND METHOD OF CONTROLLING INKJET PRINTING

CROSS-REFERENCE TO RELATED APPLICATIONS

The present application claims priority under 35 U.S.C. § 119 to Japanese Patent Application No. 2015-191076, filed on Sep. 29, 2015. The above application is hereby expressly incorporated by reference, in its entirety, into the present application.

BACKGROUND OF THE INVENTION

Field of the Invention

The present invention relates to an inkjet printer and a method of controlling inkjet printing, particularly to a control technique to reduce effects of noise from characteristics of printing paper sheets during various detections and printing corrections based on data optically read from printing results.

Description of the Related Art

Different types of printing paper sheets have different characteristics and give different printing results with the same amount of ink in the same conditions with an inkjet printer. Accordingly, to detect an ejection state or perform printing correction by optically reading the printing results, it is preferable to optimize the detection conditions or correcting operations depending on the type of the printing paper sheet. Examples of "detection" based on the read printing results include ejection failure detection to detect ejection failed nozzles, and printing defect detection to detect printing defects. Examples of "printing correction" include print density correction to achieve a predetermined print density, and print density unevenness correction to achieve printing without unevenness.

However, there are so many different types of printing paper sheets having different characteristics. Printing paper sheets having different thicknesses have different characteristics even if they are at the same grade. Besides, even at the same grade, printing paper sheets manufactured in different lots exhibit different characteristics as if they are of totally different types of printing paper sheets. This is because many types of printing paper sheets are mainly intended for use in offset printing or other conventional plate printing and not made suitable for printing with inkjet printers.

Accordingly, to perform higher quality of inkjet printing, it is effective to determine the conditions for optimizing detection or correction or prepare correction data for reading conducted for appropriate detection or correction, for individual printing paper sheets having different characteristics.

Since, however, so many types of printing paper sheets are in actual use, determination of the conditions for optimizing detection or correction or preparation of correction data for appropriate detection or correction for individual printing paper sheets complicates the process and increases the number of steps, and is therefore not a practical solution.

To solve this problem, Japanese Patent Laid-Open No. 2006-159602 proposes a method that provides preferred measurements in a measuring step of optically reading different types of printing paper sheets. The paragraph 0003 of Japanese Patent Laid-Open No. 2006-159602 says "it was found that the accuracy of correction of the density characteristics of the recording elements depends on the pattern or measured area recorded in a recording step, and the appropriate pattern or measured area varies depending on each recording media". In addition, claim 2 of Japanese Patent Laid-Open No. 2006-159602 discloses "the data recorded in the recording step is changed according to the state of the surface of a recording medium", and claim 4 of Japanese Patent Laid-Open No. 2006-159602 discloses "the area measured in the measuring step is changed according to the state of the surface of a recording medium". It should be noted that "recording medium" in Japanese Patent Laid-Open No. 2006-159602 corresponds to "printing paper sheet" in this specification. "Recording" in Japanese Patent Laid-Open No. 2006-159602 corresponds to "printing" in this specification.

SUMMARY OF THE INVENTION

Unfortunately, the method disclosed in Japanese Patent Laid-Open No. 2006-159602 cannot solve the problem that random variations in the state of the surface of a printing paper sheet affect the measurements. Moreover, although the paragraph 0026 of Japanese Patent Laid-Open No. 2006-159602 says "the reading unit observes the surface of the recording medium and the type of the recording medium is determined from the color or profile of the surface of the recording medium", how to determine the type of the recording medium from "the profile" is not clarified. Besides, Japanese Patent Laid-Open No. 2006-159602 does not clarify how to conduct optimization according to the state of the printing paper sheet.

An object of the present invention, which has been made on the above background, is to provide an inkjet printer and a method of controlling inkjet printing which provide higher-quality printings by performing appropriate detection and/or correction according to the state of a printing paper sheet to solve the problem that the state of the printing paper sheet affects the results of optical reading.

It should be noted that such a description of "A and/or B" using "and/or" (e.g., the above description "detection and/or correction") in this specification is an abbreviation of "A and B, or A or B".

To solve the problem, the invention provides the following embodiments.

An inkjet printer according to the first aspect includes: an optical reading device that optically reads at least one of an unprinted area on a printing paper sheet, a test chart printed area on a first printing in which a test chart is printed, and an image printed area on a second printing in which an image other than a test chart is printed, and acquires image data on the read area; an abnormal noise detecting device that analyzes the image data acquired by the optical reading device and detects abnormal noise on a surface of a printing paper sheet; and a control device that changes at least a setting related to detection of an ejection state of an inkjet head or a printing state, or a setting related to printing correction, based on a state of the abnormal noise detected by the abnormal noise detecting device.

The meanings of a "surface of a printing paper sheet" include a surface of a printing paper sheet as it is and a surface of a printing paper sheet defined as a printed surface of the printing paper sheet in the printed state where ink is applied thereon. The state of the printing paper sheet itself and the state of a printed surface of the printing paper sheet on which ink is applied can be determined by detecting abnormal noise on the surface of the printing paper sheet, based on image data on a read area read by the optical reading device.

Examples of the state of abnormal noise include a quantitative level (noise level) of abnormal noise showing if there is much or a little abnormal noise, the histogram of abnormal noise intensity, and the two-dimensional distribution of abnormal noise on a paper surface. The state of abnormal noise can be revealed by analyzing read data, which is image data on a read area acquired by the optical reading device. It is possible to determine whether a printing paper sheet to be used for printing is a printing paper sheet with a high level of noise or a printing paper sheet with a low level of noise, from the detected state of abnormal noise. According to the first aspect, the setting related to detection and/or printing correction is appropriately changed according to the state of abnormal noise on the surface of a printing paper sheet, which enables appropriate detection and/or printing correction with reduced effects of abnormal noise from the printing paper sheet.

In the inkjet printer according to the second aspect related to the first aspect, the setting related to detection may include at least one of the settings of test chart printing conditions, a detection algorithm, and a detection threshold.

Examples of test chart printing conditions include the mode of a chart pattern in a test chart, the number of chart patterns to be printed on a single printing paper sheet, and the number of sheets on which the same chart pattern is to be printed, and any appropriate combination thereof.

A detection algorithm may be set depending on, for example, whether cumulative sum detection in which determination is done by a plurality of detections which may or may not continuous through a plurality of continuously printed printing paper sheets, or whether continuous detection in which determination is done by continuous detection through a plurality of continuously printed printing paper sheets is used.

In the inkjet printer according to the third aspect related to the first or second aspect, the printing correction may include at least one of print density correction, print density unevenness correction, and ejection failure correction.

In the inkjet printer according to the fourth aspect related to any one of the first to third aspects, the setting related to printing correction may include at least one of settings of an amount of correction in correction processing, correction conditions, a threshold for correction, and a correction algorithm.

The fourth aspect can reduce the effects of noise from printing paper sheets and achieve appropriate printing correction.

In the inkjet printer according to the fifth aspect related to any one of the first to fourth aspects, the abnormal noise may be noise from at least one of asperities, foreign matter, surface roughness, and dirt on the surface of the printing paper sheet, non-uniformity in a thickness of the printing paper sheet, non-uniformity in paper fiber, and ink droplet interaction.

Ink droplet interaction is a phenomenon during transfer for the adjacent pixels, in which surface tension causes ink droplets for the respective pixels ejected from the inkjet head to join and attract one another on a printing paper sheet and thus to be placed in positions deviating from target pixel positions. The amount of deviation is affected by the physical properties of the ink and the physical properties of the surface of the printing paper sheet, surface energy, and the shapes of microscopic asperities and imbalances in distribution of these microscopic asperities. It can be therefore said that the amount of deviation is affected by abnormal noise on the surface of the printing paper sheet. Each pixel deviating by a large amount is visually recognized as unevenness.

In the inkjet printer according to the sixth aspect related to any one of the first to fifth aspects, the image data acquired by the optical reading device may be read data on a blank area on a printing paper sheet, and the abnormal noise detecting device may detect, from the read data on the blank area, the abnormal noise from at least one of asperities, foreign matter, surface roughness, and dirt on the surface of the printing paper sheet, non-uniformity in a thickness of the printing paper sheet, and non-uniformity in paper fiber.

Read data refers to image data on a read image, which is image data on a read area read by the optical reading device.

In the inkjet printer according to the seventh aspect related to any one of the first to sixth aspects, the first printing may include the unprinted area, and reading of the unprinted area and the test chart printed area may be done by reading the first printing once.

The seventh aspect allows read data on an unprinted area on a printing paper sheet and read data on a test chart to be acquired with a single reading operation.

In the inkjet printer according to the eighth aspect related to the sixth or seventh aspect, the abnormal noise detecting device may determine a blank-read average value that is an average value of read values on the blank area, based on read data on the blank area on the printing paper sheet obtained by reading of the unprinted area and may detect, as a pixel having the abnormal noise, a read pixel having a difference between the read value on the blank area and the blank-read average value, the difference having an absolute value exceeding a first threshold.

The first threshold is used to determine if there is abnormal noise. The first threshold may be predetermined or appropriately determined according to variations in read data on a blank area.

In the inkjet printer according to the ninth aspect related to the eighth aspect, the state of abnormal noise may include at least one of a number of pixels having the abnormal noise and a proportion of pixels having the abnormal noise, and when the number of pixels having the abnormal noise exceeds a second threshold or the proportion of pixels having the abnormal noise exceeds a third threshold, at least one of the setting related to detection and the setting related to printing correction may be changed.

According to the ninth aspect, when the number of pixels having the abnormal noise exceeds the second threshold or when the proportion of pixels having the abnormal noise exceeds the third threshold, it may be determined that there is much noise. According to the ninth aspect, a detection method and/or correction processing that is less susceptible to noise is selected to perform appropriate detection and/or correction.

In the inkjet printer according to the tenth aspect related to the ninth aspect, the state of abnormal noise may include a density level of pixels having the abnormal noise, and when the number of pixels having the abnormal noise exceeds the second threshold or the proportion of pixels having the abnormal noise exceeds the third threshold, and when the density level of pixels having the abnormal noise exceeds a fourth threshold, at least one of the setting related to detection and the setting related to printing correction may be changed.

The density level of pixels having the abnormal noise can be quantified in the following manner, for example. For every pixel having the abnormal noise, a distance from one pixel having the abnormal noise to the adjacent pixel having the abnormal noise is defined as a minimum distance for that pixel having the abnormal noise. The density level of pixels having the abnormal noise can be quantified by determining a minimum distance for every pixel having the abnormal noise and then an average minimum distance. When the average minimum distance between pixels having the abnormal noise (average distance) is smaller than a predetermined distance, the density level can be determined to be high.

In the inkjet printer according to the eleventh aspect related to any one of the eighth to tenth aspects, the first threshold may be determined by a standard deviation of blank area read values in the read data on the blank area.

For example, the first threshold can be defined as a multiple of a standard deviation of read values on a blank area.

In the inkjet printer according to the twelfth aspect related to any one of the first to fifth aspects and the seventh aspect, the optical reading device may read the test chart printed area on the first printing and acquire read data on the test chart.

According to the twelfth aspect, read data on the state of the surface of a printing paper sheet on which ink is applied can be acquired.

In the inkjet printer according to the thirteenth aspect related to the twelfth aspect, the abnormal noise detecting device may determine an average same density image read value that is an average value of read values in an image of the same density area of the test chart, based on read data on the test chart and may detect, as a pixel having the abnormal noise, a read pixel exhibiting a difference between the read value in the image of the same density area and the average same density image read value, the difference having an absolute value exceeding a fifth threshold.

The test chart used in the thirteenth aspect may be a print density correction test chart and/or a print density unevenness correction test chart.

In the inkjet printer according to the fourteenth aspect related to the thirteenth aspect, the state of abnormal noise may include at least one of a number of pixels having the abnormal noise and a proportion of pixels having the abnormal noise, and when the number of pixels having the abnormal noise exceeds a sixth threshold or when the proportion of pixels having the abnormal noise exceeds a seventh threshold, at least one of the setting related to detection and the setting related to printing correction may be changed.

Moreover, as in the tenth aspect, the inkjet printer according to the fourteenth aspect may additionally include a configuration for checking the density level of pixels having the abnormal noise.

In the inkjet printer according to the fifteenth aspect related to the thirteenth or fourteenth aspect, the fifth threshold may be determined by a standard deviation of read values in the image of the same density area of the test chart.

For example, the fifth threshold can be defined as a multiple of a standard deviation of read values in the image of a uniform density area.

In the inkjet printer according to the sixteenth aspect related to any one of the eighth to eleventh aspects and the thirteenth to fifteenth aspects, the control device may perform computing for correction by removing pixels having the abnormal noise from read data acquired by the optical reading device, during correction processing in the printing correction.

"Computing for correction" involves processing for calculating a correction value and processing for adjusting the amount of correction. The sixteenth aspect enables correction with higher accuracy.

In the inkjet printer according to the seventeenth aspect related to the twelfth aspect, the first printing on which an ejection failure detection test chart is printed may be read by the optical reading device, the abnormal noise detecting device may detect the abnormal noise from a pattern of the ejection failure detection test chart, and the control device may change at least one of an amount of correction, correction conditions, a threshold, a correction algorithm, the number of test chart printing operations, and the ejection failure detection test chart during correction processing in ejection failure correction, based on the state of abnormal noise detected by the abnormal noise detecting device.

The pattern of a printed test chart is deformed by the effects of asperities on the surface of a printing paper sheet. It is therefore possible to estimate the state of the printing paper sheet by analyzing the pattern from read data.

It should be noted that a failure detection test chart and an image based on image data designated to be printed can be printed on a single printing paper sheet. The first printing and the second printing are this type of printing.

In the inkjet printer according to the eighteenth aspect related to any one of the first to fifth aspects, the optical reading device may read the image printed area on the second printing and acquire read data on an image printed on the second printing, and the abnormal noise detecting device may detect the abnormal noise by extracting a solid area of a uniform density from read data on the printed image acquired by reading of the second printing, and analyzing the frequency of the solid area.

A "uniform density area" is not necessarily an area where the density is uniform and may also be an area with a small amount of variations in density where the density can be regarded as generally uniform.

The inkjet printer according to the nineteenth aspect related to any one of the first to eighteenth aspects may further include at least one correction device selected from the group consisting of a print density correcting device that performs processing in print density correction, and a print density unevenness correcting device that performs processing in print density unevenness correction. The correction device performs correction such that at least one read data related to the correction device, selected from the group consisting of read data on a print density correction test chart and read data on a print density unevenness correction test chart is subjected to a low-pass filter by changing the setting related to printing correction according to the state of abnormal noise.

The nineteenth aspect can reduce the effects of unevenness due to droplet interaction.

The inkjet printer according to the twentieth aspect related to any one of the first to nineteenth aspects may further include an ejection failure correcting device that performs ejection failure correction. A current determination method is changed, by changing the setting related to printing correction according to the state of abnormal noise, to at least one determination method selected from the group consisting of relaxing a failure determining threshold of an ejection position error, determining an ejection failure from a plurality of cumulative sum detections, and determining an ejection failure from a plurality of continuous detections.

In the inkjet printer according to the twenty-first aspect related to any one of the first to fifth aspects, the optical reading device may read the second printing on which an image other than a test chart and based on image data designated to be printed is printed and acquire read data on the image printed on the second printing, and the abnormal noise detecting device may detect the abnormal noise by calculating a difference between read data read from the second printing and the image data designated to be printed and analyzing the frequency of a difference image.

In the inkjet printer according to the twenty-second aspect related to the twenty-first aspect, characteristics detected from the difference image may be differences in print density and color, and the control device may change settings related to print density correction for target ranges of print density and color, according to the state of abnormal noise detected by the abnormal noise detecting device.

In the inkjet printer according to the twenty-third aspect related to the twenty-first aspect, characteristics detected from the difference image may be density unevenness and/or color unevenness in the form of streaks extending parallel with a paper sheet transport direction.

The inkjet printer according to the twenty-fourth aspect related to the first to twenty-third aspects may further include an information notification device that notifies a user of information on the state of abnormal noise detected by the abnormal noise detecting device.

It is preferable that information that there is much noise be provided to the user, who is the operator of the inkjet printer, when the fact that there is much noise is revealed from the detected state of abnormal noise.

The inkjet printer according to the twenty-fifth aspect related to the twenty-fourth aspect, the information on the state of abnormal noise may include at least one type of information selected from the group consisting of noise level, abnormality type, frequency, spatial frequency, and imbalances in distribution.

In the inkjet printer according to the twenty-sixth aspect related to the twenty-fifth aspect, the notification may include at least a recommended operation method or recommended setting method for correction processing.

A method of controlling inkjet printing according to the twenty-seventh aspect includes: an optical reading step of optically reading at least one of an unprinted area on a printing paper sheet, a test chart printed area on a first printing in which a test chart is printed, and an image printed area on a second printing in which an image other than a test chart is printed, and acquiring image data on the read area; an abnormal noise detecting step of analyzing the image data acquired in the optical reading step and detecting abnormal noise on a surface of a printing paper sheet; and a control step of changing at least a setting related to detection of an ejection state of an inkjet head or a printing state, or a setting related to printing correction, based on a state of the abnormal noise detected in the abnormal noise detecting step.

In the twenty-seventh aspect, factors similar to the factors specified in the second to twenty-sixth aspects can be used in an appropriate combination. In this case, a device in charge of processing or a function specified in the inkjet printer is understood as an element for "Step" of processing or operation related to this.

According to the present invention, appropriate detection and/or correction can be performed according to the state of a printing paper sheet, which results in a high-quality printing.

DETAILED DESCRIPTION OF THE EMBODIMENTS

Preferred embodiments of the present invention will now be described with reference to the attached drawings.

Overview of Embodiments

An inkjet printer according to an embodiment of the present invention is an inkjet printer that enables printing on a plurality of types of printing paper sheets having different characteristics and optically reads the printing results and printing paper sheets just as they are in order to perform various detections and printing corrections based on the read data. In particular, the inkjet printer optically reads, during printing, at least one of a printing paper sheet just as it is, a first printing with a test chart printed thereon, a second printing with a print target image other than test charts printed thereon, in order to obtain analysis data used to analyze the state of the surface of each printing paper sheet. Analysis data is part or all of read data (read image) which is image data acquired by optical reading. The inkjet printer analyzes the read data and controls detection and/or correction depending on the state of abnormal noise detected on the surface of a printing paper sheet. To be specific, the inkjet printer detects the state of the surface or printing state of the printing paper sheet from the read data, and changes, for example, the detection method and detection conditions, or the method of calculating the amount of correction for each printing paper sheet, thereby reducing the effects of abnormal noise, which results from the printing paper sheet, on detection and/or correction and providing higher-quality printings. It should be noted that "printing paper sheet" may be simply referred to as "paper sheet" or "sheet".

[Example of Structure of Inkjet Printer]

Figure 1:
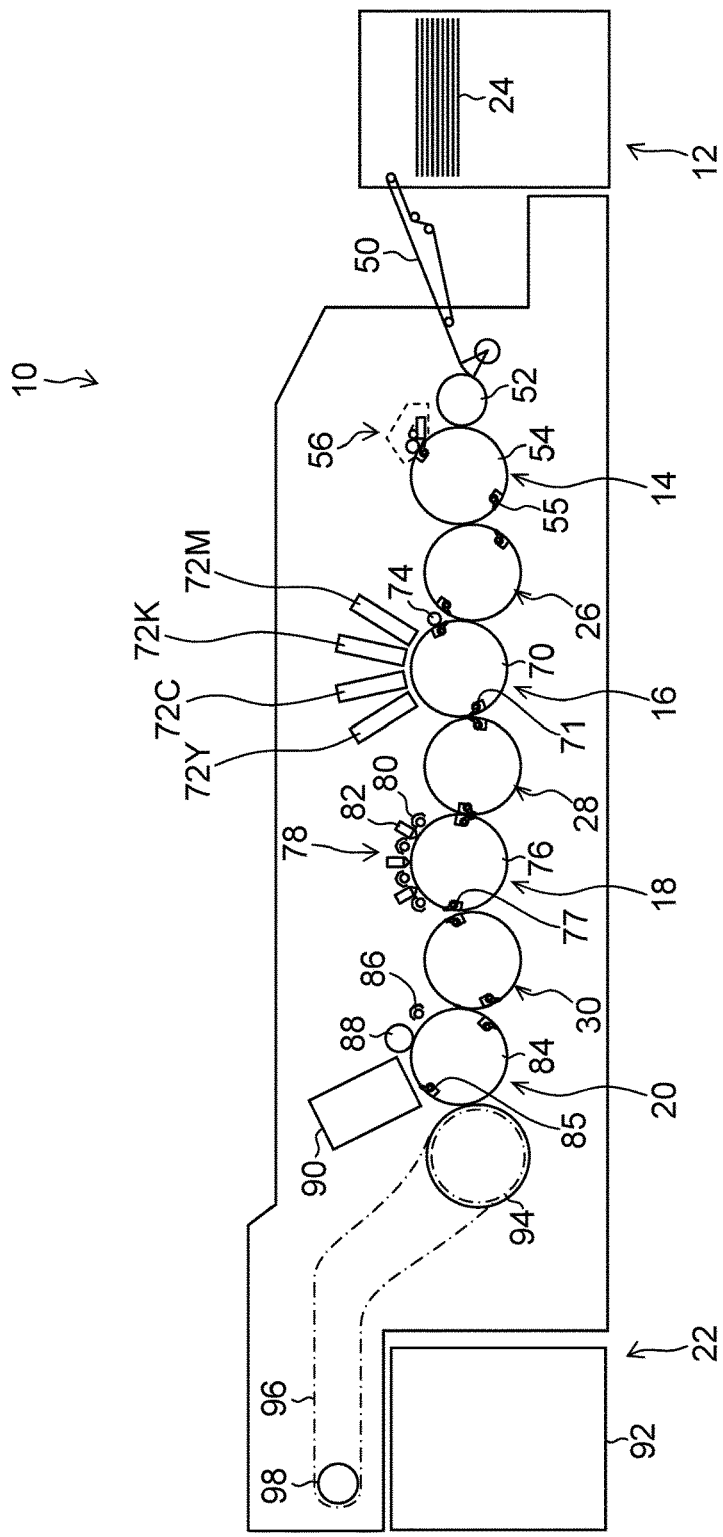
FIG. 1 is a configuration diagram of an inkjet printer according to an embodiment of the present invention.

FIG. 1 is a configuration diagram of an inkjet printer 10 according to the embodiment of the present invention. The inkjet printer 10 in this example includes a sheet feeder 12, a liquid agent supplying unit 14, a transfer unit 16, a drier 18, a fuser 20, and a sheet ejector 22. The inkjet printer 10 can transport various types of printing paper sheets 24 and performs printing by ejecting ink droplets from inkjet heads 72M, 72K, 72C, and 72Y in the transfer unit 16, according to printing data designated to be printed. Each of the inkjet heads 72M, 72K, 72C, and 72Y is a line head having an image-transferrable length covering the width of each printing paper sheet 24. The inkjet printer 10 is a so-called single path printer that enables printing on the entire paper sheet by moving the printing paper sheet 24 in a direction orthogonal to the longitudinal direction of the inkjet heads 72M, 72K, 72C, and 72Y.

The sheet feeder 12 is a system that feeds the printing paper sheets 24 to the liquid agent supplying unit 14. The sheet feeder 12 has printing paper sheets 24 which are cut-sheet paper stacked on it. The sheet feeder 12 feeds the printing paper sheets 24 from the paper feed tray 50 to the liquid agent supplying unit 14 sheet by sheet. Cut-sheet paper is used as the printing paper sheets 24 in this example, although sheets cut out of continuous sheet of paper (roll paper) into required sizes may be fed instead.

The liquid agent supplying unit 14 is a system that supplies a liquid agent on a recording surface of each printing paper sheet 24. The liquid agent contains a component that flocculates or thickens a color material (pigment or dye) in the ink. Examples of a method of flocculating or thickening the color material include use of a liquid agent that reacts with the ink to precipitate the color material in the ink or make the color material insoluble, and use of a liquid agent that generates a semisolid material (gel) containing the color material in the ink. Examples of a way of causing a reaction between the ink and the liquid agent include a method of causing a reaction between an anionic color material in the ink and a cationic compound in the liquid agent, a method of mixing an ink and a liquid agent having different potentials of hydrogen (pH) to change the pH of the ink and disperse the pigment in the ink so that the pigment can be flocculated, and a method of causing a reaction between the pigment in the ink and a multivalent metal salt in the liquid agent to disperse and thus flocculate the pigment.

The liquid agent supplying unit 14 includes a feed cylinder 52, a liquid agent drum 54, and a liquid agent applying device 56. Each printing paper sheet 24 fed from the sheet feeder 12 is received by the feed cylinder 52 and then transported to the liquid agent drum 54.

The liquid agent drum 54 has a gripper 55 serving as a holder hook on the outer surface so that the gripper 55 can hold an edge of the printing paper sheet 24. The printing paper sheet 24 is transported by rotation of the liquid agent drum 54 while being held by the gripper 55 at the edge. Alternatively, the liquid agent drum 54 may have suction holes in the outer surface to suck the printing paper sheet 24 through the suction holes and hold the printing paper sheet 24 on the outer surface of the liquid agent drum 54 by suction.

The liquid agent applying device 56 includes, for example, a liquid agent container containing a liquid agent, a measuring roller partially soaked in the liquid agent in the liquid agent container, a squeegee adjoining the measuring roller, a rubber roller that is made in contact with the measuring roller and the printing paper sheet 24 residing on the liquid agent drum 54 by pressure and transfers the measured liquid agent onto the printing paper sheet 24, although there is no particular limitation on the structure of the liquid agent applying device 56. The liquid agent applying device 56 can apply a constant amount of liquid agent to the printing paper sheet 24. The liquid agent can be applied with a roller, a spray, inkjet heads or other methods.

The transfer unit 16 is a system that transfers an image based on an input image by jetting ink droplets by the inkjet technique. The transfer unit 16 includes a transfer drum 70 and inkjet heads 72M, 72K, 72C, and 72Y serving as transfer devices. The transfer drum is also referred to as "transfer cylinder" or "jetting cylinder".

The transfer drum 70 has a gripper 71 serving as a holder hook on the outer surface so that the gripper 71 can hold an edge of the printing paper sheet 24. The printing paper sheet 24 is transported by rotation of the transfer drum 70 while being held by the gripper 71 at the edge. The transfer drum 70 also has a plurality of suction holes (not shown in the drawing) in the outer surface to suck the printing paper sheet 24 through the suction holes and hold the printing paper sheet 24 on the outer surface by suction.

The printing paper sheet 24 fixed to the transfer drum 70 is transported while its recording surface faces outward and the ink is jetted from the inkjet heads 72M, 72K, 72C, and 72Y onto the recording surface.

The inkjet head 72M ejects droplets of magenta (M) ink. The inkjet head 72K ejects droplets of black (K) ink. The inkjet head 72C ejects droplets of cyan (C) ink. The inkjet head 72Y ejects droplets of yellow (Y) ink. The inkjet heads 72M, 72K, 72C, and 72Y are supplied with the respective colors of ink from the respective ink tanks, which are not shown in the drawing.

Each of the inkjet heads 72M, 72K, 72C, and 72Y is a full-line inkjet recording head that has a length covering the maximum width of an image-forming area in each printing paper sheet 24 and has an ink-ejecting surface with a nozzle line (a two-dimensional array of nozzles) in which a plurality of ink-ejecting nozzles is arranged along the full width of the image-forming area. A full-line recording head is also referred to as "page-wide head".

Each of the inkjet heads 72M, 72K, 72C, and 72Y is disposed so as to extend in a direction orthogonal to the paper sheet transport direction in which the printing paper sheet 24 is transported (a direction in which the transfer drum 70 rotates). The paper sheet transport direction is referred to as "sub-scanning direction" and the paper sheet width direction orthogonal to the paper sheet transport direction is referred to as "main scanning direction".

As for an inkjet head including a two-dimensional array of nozzles, a projected nozzle line formed in such a way that the two-dimensional array of nozzles is projected (orthogonally projected) so that they can be arranged in the main scanning direction can be regarded as being equal to a single nozzle line consisting of nozzles arranged at almost regular intervals with a nozzle density that accomplishes the maximum print resolution in the main scanning direction. The term "almost regular intervals" refers to substantially regular intervals at which droplets can be recorded with an inkjet printer. For example, "regular intervals" may include intervals slightly differentiated to give a margin for the motion of liquid droplets on a printing paper sheet due to manufacturing errors or droplet interaction. When a projected nozzle line (also referred to as "actual nozzle line") is taken into consideration, nozzle numbers representing nozzle positions can be allocated, in sequence, to the projection nozzles arranged in the main scanning direction.

Just one-time operation to move the printing paper sheet 24 relatively to the full-line inkjet heads 72M, 72K, 72C, and 72Y, i.e., one-time sub-scanning enables an image with a predetermined print resolution to be recorded on an image-forming area in a printing paper sheet. A technique to complete an image with one-time transfer scanning is referred to as "single path printing technique".

Figure 3:
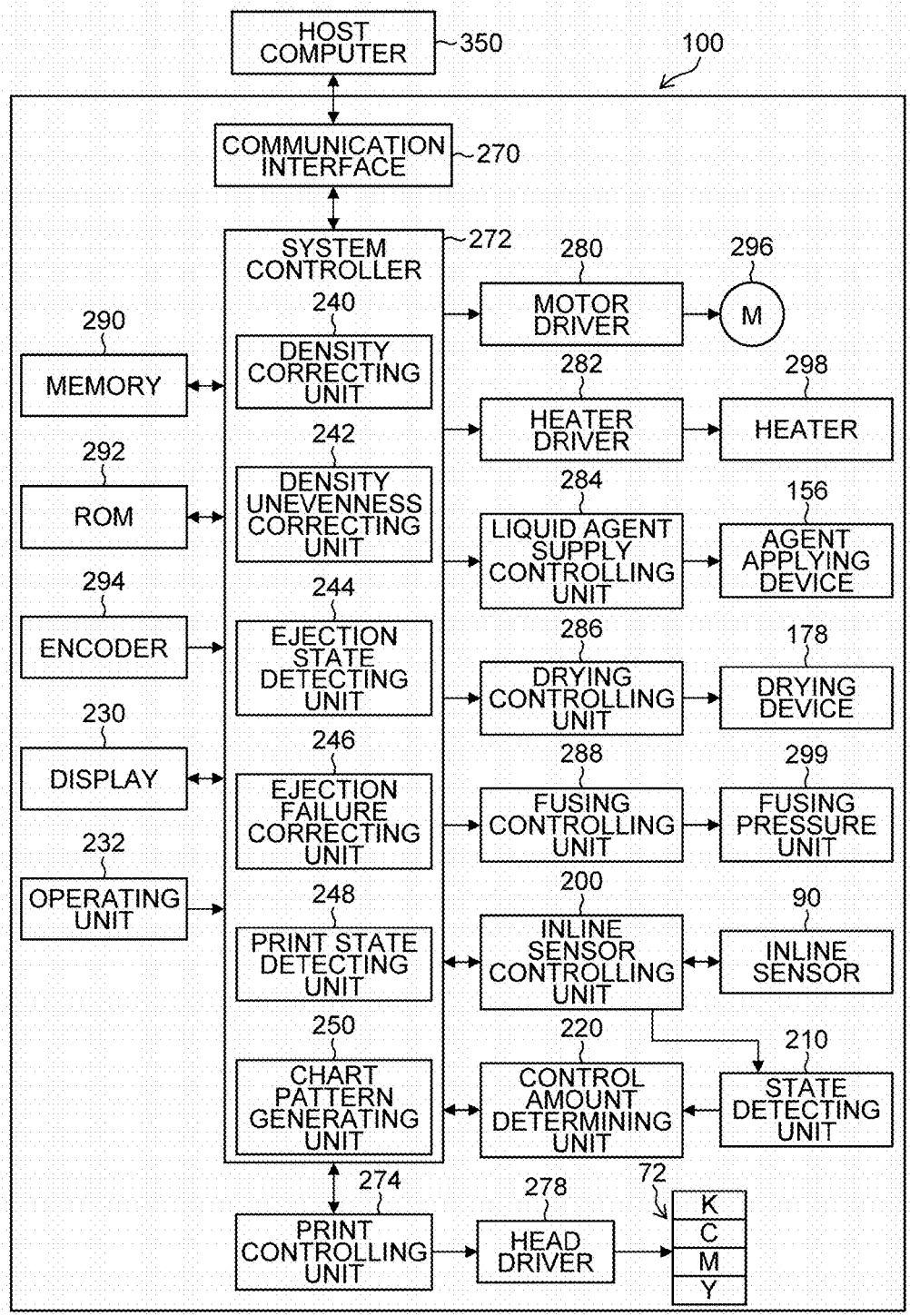
FIG. 3 is a block diagram of the inkjet printer.

The timing of when each of the inkjet heads 72M, 72K, 72C, and 72Y ejects a droplet is in synchronization with a signal (encoder signal) of an encoder that detects the rotation rate of the transfer drum 70 (not shown in FIG. 1 and designated by the reference numeral 294 in FIG. 3). Ejection trigger signals are generated based on encoder signals. This allows the positions onto which droplets are jetted to be determined with high accuracy. This also allows for preliminary learning of fluctuations in the rotation rate of the transfer drum 70 due to runout, and correction of the timings of ejecting droplets given by the encoder, thereby reducing unevenness of jetted droplets, independently of the runout of the transfer drum 70, the accuracy of the rotation axis, the rotation rate of the transfer drum 70, and other factors.

It is preferable to perform maintenance such as cleaning of the nozzle surface and ejection of thickened ink for each of the inkjet heads 72M, 72K, 72C, and 72Y after recessing, i.e., moving each of the inkjet heads 72M, 72K, 72C, and 72Y out of the transfer drum 70.

This example illustrates a structure using standard colors (four colors) of CMYK without limiting the combination of ink colors or the number of colors to those in this embodiment and may additionally include light-color ink, dark-color ink, or special-color ink as needed. For example, an inkjet head that ejects light-type ink, such as light cyan or light magenta, can be added to the structure without a particular limitation on the order in which the heads are arranged.

The printing paper sheet 24 on which an image is transferred by the transfer unit 16 is transported from the transfer drum 70 to the intermediate transfer unit 28 and then to a drier drum 76 in the drier 18.

The drier 18 is a system that dehydrates a solvent separated by the flocculation of the color material. The drier 18 includes the drier drum 76 and a solvent drying device 78. The drier drum 76 is also referred to as "dryer cylinder". Like the liquid agent drum 54, the drier drum 76 has a gripper 77 serving as a holder hook on the outer surface so that the gripper 77 can hold an edge of the printing paper sheet 24.

The solvent drying device 78 includes a plurality of halogen heaters 80 and hot-air ejecting nozzles 82, each residing between the halogen heaters 80, disposed in positions where they face the outer surface of the drier drum 76. Various dry conditions can be achieved by appropriately adjusting the temperature and amount of hot air blew from the hot-air ejecting nozzles 82 on the printing paper sheet 24 and the temperature of the halogen heaters 80.

The printing paper sheet 24 is held on the outer surface of the drier drum 76 in the state where the recording surface of the printing paper sheet 24 faces outward (specifically, the recording surface of the printing paper sheet 24 is bowed outward) and dried while being transported by rotation, thereby preventing occurrence of creases and embossed portions in the printing paper sheet 24 and dry unevenness due to these factors.

After dried in the drier 18, the printing paper sheet 24 is transported from the drier drum 76 to the intermediate transfer unit 30 and then to a fuser drum 84 of the fuser 20.

The fuser 20 includes a fuser drum 84, a halogen heater 86, a fuser roller 88, and an inline sensor 90. The fuser drum 84 is also referred to as "fuser cylinder". Like the liquid agent drum 54, the fuser drum 84 has a gripper 85 serving as a holder hook on the outer surface so that the gripper 85 can hold an edge of the printing paper sheet 24.

The printing paper sheet 24 is transported by rotation of the fuser drum 84 in the state where its recording surface faces outward, and the recording surface undergoes preheating with the halogen heater 86, fusing with the fuser roller 88, and inspection with the inline sensor 90. If ultraviolet (UV) curable ink is used, a UV lamp, a UV laser diode array, or other UV irradiators is provided instead of the fuser roller 88 which gives thermal compression fusing.

The inline sensor 90 is an optical reading unit that optically reads paper sheets that have undergone printing in the transfer unit 16 and unprinted printing paper sheets 24, and generates data on read images. The inline sensor 90 corresponds to one mode of the "optical reading device". A read image is also referred to as "scanned image". The data on a read image is referred to as "read data" and the value of each pixel of the read image is referred to as "pixel value" or "read value". An unprinted printing paper sheet 24 is referred to as "blank sheet".

The inline sensor 90 can read the printing paper sheets 24 just as they are or images on the printings during transport of the printing paper sheets 24 on the fuser drum 84. Examples of images printed on the printing paper sheets 24 include, in addition to images designated by a printing job to be printed, print density correction test charts, ejection failure detection test charts, print density unevenness correction test charts, and other test charts. Examples of a printing read by the inline sensor 90 include a printing consisting of a single printing paper sheet on which only a test chart is printed, a printing consisting of a single printing paper sheet on which only an image other than test charts is printed, and a printing consisting of a single printing paper sheet on which both a test chart and an image other than test charts are printed. An image other than test charts corresponds to an image designated by a printing job to be printed and is referred to as "print target image", "print object image", or "actual image". An image designated by a printing job to be printed corresponds to "an image based on image data designated to be printed". An area on the printing paper sheet 24 where an image based on image data designated to be printed is referred to as "image printed area".

A print density correction test chart is a test chart printed to measure print density during correction of print density. An ejection failure detection test chart is a test chart printed to detect nozzles having ejection failures. A print density unevenness correction test chart is a test chart printed to measure print density unevenness during correction of print density unevenness.

The image read from the inline sensor 90 is used in detection of an ejection state, measurement of an image density, detection of defects in printed images, and other processing. Although the inline sensor 90 in this example is disposed in the fuser 20, the inline sensor 90 may be disposed in a position where it faces the transfer drum 70 of the transfer unit 16 in carrying out the invention.

The printing paper sheet 24 that has undergone fusing in the fuser 20 is passed from the fuser drum 84 to a pair of transport belts 96 and then fed to the sheet ejector 22 by the transport belts 96. Each transport belt 96, which has no ends, is wrapped around a passing cylinder 94 and a tension roller 98. The details of a paper sheet transport unit consisting of the transport belts 96 are not shown in the drawing. The transport belts 96 are disposed on both sides of a paper sheet transport path, that is, both sides of each printing paper sheet 24 in the paper sheet width direction orthogonal to the paper sheet transport direction. While a gripper on a bar running between the pair of transport belts 96 (not shown in the drawing) holds an edge of the paper sheet, the printing paper sheet 24 is transported above a paper output tray 92 by rotation of the transport belt 96.

The sheet ejector 22 includes a paper output tray 92 to collect a stack of printing paper sheets 24. The grippers, which are not shown in the drawing, on the transport belts 96 drop each printing paper sheet 24 when they come to above the paper output tray 92 so that the printing paper sheets 24 can be stacked on the paper output tray 92.

Although not shown in FIG. 1, the inkjet printer 10 in this example includes, in addition to the above-described components, an ink storage/charging member that supplies ink to each of the inkjet heads 72M, 72K, 72C, and 72Y, and a device for supplying a liquid agent to the liquid agent supplying unit 14. The inkjet printer 10 also includes a head maintenance member that performs cleaning (e.g., wiping and purge of a nozzle surface and nozzle suction) of each of the inkjet heads 72M, 72K, 72C, and 72Y, a position detecting sensor that detects the position of each printing paper sheet 24 on the paper sheet transfer path, and a temperature sensor that detects the temperature of each device.

[Example Structure of Inline Sensor 90]

Figure 2:
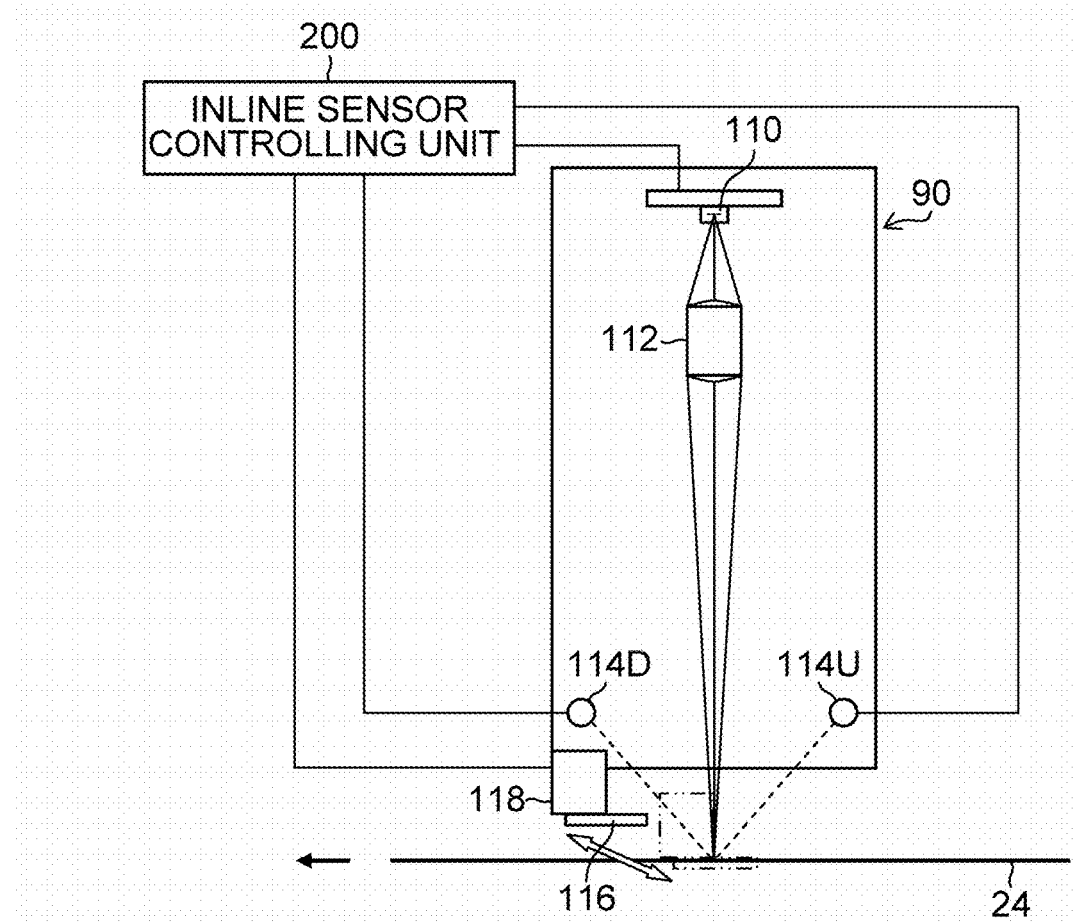
FIG. 2 is a schematic cross-sectional view illustrating the structure of an inline sensor.

FIG. 2 is a schematic cross-sectional view of the structure of the inline sensor 90. The inline sensor 90 contains a color CCD linear image sensor 110, which performs color separation into three primary colors of R (red), G (green), and B (blue), a lens 112, illuminating lamps 114U and 114D, a white reference plate 116, and a driving unit 118 for the white reference plate 116. The term "CCD" is an abbreviation of "charge-coupled device". It should be noted that a color CMOS linear image sensor can be used instead of the color CCD linear image sensor 110. The term "CMOS" is an abbreviation of "complementary metal oxide semiconductor".

The color CCD linear image sensor 110 is an image sensor consisting of a one-dimensional linear array of photoreceptors for R, G, and B colors, and reads a two-dimensional image of a target to be read, by moving a target to be read and the inline sensor 90 relatively to each other in a direction orthogonal to the one-dimensional array of photoreceptors.

The lens 112 forms an optical image of the target to be read, on the color CCD linear image sensor 110. The lamps 114U and 114D are light sources to illuminate the target to be read. The lamps 114U and 114D emit light toward the target to be read respectively from the upstream side and downstream side in the transport direction for the printing paper sheet 24. FIG. 2 schematically shows light emitted from each of the lamps 114U and 114D with dashed lines.

The white reference plate 116 is a reference plate used to determine the "white" (maximum) signal value serving as a reference for a read value given by the color CCD linear image sensor 110. Since the read value given by the color CCD linear image sensor 110 depends on the reflectivity of the target to be read, "a reference for the read value" corresponds to a reference for the reflectivity.

The driving unit 118 is a device that moves the white reference plate 116 between a readable position where it can be read by the color CCD linear image sensor 110 and a recessed position (unreadable position) where it cannot be read by the color CCD linear image sensor 110. FIG. 2 shows a state where the white reference plate 116 is in the recessed position with a solid line, and a state where the white reference plate 116 is in the readable position with a phantom line.

The inline sensor controlling unit 200 controls the color CCD linear image sensor 110, the lamps 114U and 114D, and the white reference plate 116, and acquires data on the read image from the inline sensor 90. The inline sensor controlling unit 200 can move the white reference plate 116 to the readable position or move the white reference plate 116 in the readable position to the recessed position in a given timing by controlling the driving unit 118. The inline sensor controlling unit 200 controls the switching between on and off and the light intensity for the lamps 114U and 114D. The inline sensor controlling unit 200 controls the operation of the color CCD linear image sensor 110 and acquires the data on the read image (read data) from the inline sensor 90.

[Description of Control System]

FIG. 3 is a block diagram of the inkjet printer 10. The inkjet printer 10 includes a communication interface 270, a system controller 272, a print controlling unit 274, a head driver 278, a motor driver 280, a heater driver 282, a liquid agent supply controlling unit 284, a drying controlling unit 286, a fusing controlling unit 288, an inline sensor controlling unit 200, a state detecting unit 210, and a control amount determining unit 220. The inkjet printer 10 also includes a memory 290, a read-only memory (ROM) 292, an encoder 294, a display 230, and an operating unit 232.

The inkjet printer 10 is connected to a host computer 350 via the communication interface 270 so that it can transmit/receive data to/from the host computer 350. The communication interface 270 is a wired or wireless communication interface. The communication interface 270 may be equipped with a buffer memory (not shown in the drawing) for higher-speed communication.

The communication interface 270 functions as an image input unit that receives image data from the host computer 350. Image data fed from the host computer 350 is input to the inkjet printer 10 via the communication interface 270 and stored in the memory 290.

The memory 290 is a memory device for storing images input via the communication interface 270 and writing/reading data to/from the memory 290 is performed through the system controller 272. The memory 290 is not necessarily a memory consisting of a semiconductor element and may be a magnetic medium such as a hard disc.

The system controller 272 includes a central processing unit (CPU) and peripheral circuits and functions as a control device that controls the entire inkjet printer 10 according to a predetermined program and as an arithmetic device that performs various arithmetic computations. The system controller 272 controls the communication interface 270, the print controlling unit 274, the motor driver 280, the heater driver 282, the liquid agent supply controlling unit 284, and other units, controls communication with the host computer 350 and writing/reading of the memory 290, and generates control signals for controlling a motor 296 in the transport system and a heater 298.

The system controller 272 executes a predetermined program to perform processing for generation of print density correction parameters, processing for print density correction, processing for generation of print density unevenness correction parameters, processing for print density unevenness correction, processing for detection of ejection failed nozzles, processing for ejection failure correction, and processing for detection of print failure.

The ROM 292 stores, for example, programs to be executed by the CPU in the system controller 272 and various data needed for the control. Chart data needed to output test charts is stored in the ROM 292. The ROM 292 may be either a non-rewritable memory device or a rewritable memory device.

The memory 290, which is used as a temporal storage area for image data, is also used as a program expansion area and a computing area for the CPU.

The motor driver 280 is a driver that drives the motor 296 according to instructions from the system controller 272. In FIG. 3, reference numeral 296 collectively designates different motors disposed in parts of the inkjet printer. The motor 296 in FIG. 3 includes, for example, motors causing rotation of the feed cylinder 52, the liquid agent drum 54, the transfer drum 70, the drier drum 76, the fuser drum 84, the passing cylinder 94 and other members in FIG. 1; a pump drive motor for suction with negative pressure through suction holes in the transfer drum 70; and a motor serving as a recessing unit for moving the head units of the inkjet heads 72M, 72K, 72C, and 72Y to a maintenance area out of the transfer drum 70. It should be noted that the inkjet heads 72M, 72K, 72C, and 72Y illustrated in FIG. 1 are collectively illustrated as an inkjet head 72 in the block diagram of FIG. 3. Reference numeral 72 will hereinafter collectively designate the inkjet heads of all these colors.

The heater driver 282 is a driver that drives the heater 298 according to instructions from the system controller 272. In FIG. 3, reference numeral 298 collectively designates different heaters disposed in parts of the inkjet printer. The heater 298 in FIG. 3 includes, for example, a heater in the drier 18 and a preheater (not shown in the drawing) for preheating the printing paper sheets 24 to an appropriate temperature in the sheet feeder 12.

The liquid agent supply controlling unit 284 controls the operation of the liquid agent applying device 56 (see FIG. 1) according to instructions from the system controller 272. The drying controlling unit 286 controls operation of the solvent drying device 78 (see FIG. 1) according to instructions from the system controller 272.

The fusing controlling unit 288 controls the operation of a fusing pressure unit 299 consisting of the halogen heater 86 and the fuser roller 88 of the fuser 20 (see FIG. 1) according to instructions from the system controller 272.

As described with reference to FIG. 2, the inline sensor 90 is a block including the color CCD linear image sensor 110 and optically reads the printing paper sheets 24 or images printed on the printing paper sheets 24 to provide data on the read image to the inline sensor controlling unit 200.

As described with reference to FIG. 2, the inline sensor controlling unit 200 controls the color CCD linear image sensor 110, the lamps 114U and 114D, and the white reference plate 116 in the inline sensor 90 and sends read images acquired from the inline sensor 90 to the system controller 272 and the state detecting unit 210.

The state detecting unit 210 quantitatively detects at least one of the state of the surface and the print state of each printing paper sheet 24, based on the read image from the inline sensor 90.

The control amount determining unit 220 calculates parameters used for print density correction, density unevenness correction, ejection state detection, ejection failure correction, print failure detection, and other processing conducted in the system controller 272, based on at least one of the state of the surface and the print state of each printing paper sheet 24 detected by the state detecting unit 210, and sends the calculated parameters to the system controller 272. Examples of the parameters calculated by the control amount determining unit 220 include control parameters related to conditions for printing test charts, parameters designating algorithms for detecting ejection failures, thresholds used for detection (detection thresholds), and correction values of data.

The system controller 272 performs print density correction, print density unevenness correction, ejection state detection, ejection failure correction, and other processing based on the read images from the inline sensor 90 and sends an instruction to the print controlling unit 274 so that high-quality printing can be performed based on the results. At this time, the system controller 272 uses the parameters calculated by the control amount determining unit 220 to perform optimum processing for individual printing paper sheets 24.

The system controller 272 includes a density correcting unit 240, a density unevenness correcting unit 242, an ejection state detecting unit 244, an ejection failure correcting unit 246, a print state detecting unit 248, and a chart pattern generating unit 250. The density correcting unit 240 is a processing unit that performs correction processing during print density correction. The density unevenness correcting unit 242 is a processing unit that performs correction processing during print density unevenness correction. The ejection state detecting unit 244 is a processing unit that performs detection processing for detecting the ejection state of the inkjet head 72.

The ejection state detecting unit 244 detects ejection failed nozzles. The ejection failure correcting unit 246 is a processing unit that performs correction processing during ejection failure correction for correcting image defects caused by the ejection failed nozzles. The ejection failure correcting unit 246 performs ejection failure correction, based on the results of the detection of ejection failed nozzles performed by the ejection state detecting unit 244.

The print state detecting unit 248 compares image data on a designated print image with data on a read image on a printing and determines failure or no-failure in the printing results, such as presence or absence of any image defect.

The chart pattern generating unit 250 generates chart output data needed to output various test charts, such as a test chart for print density correction, a test chart for ejection failure detection, and a test chart for print density unevenness correction. The chart pattern generating unit 250 may be configured to either originally contain chart pattern data on predetermined various test charts or generate chart pattern data as appropriate. The chart pattern generating unit 250 in this example has a function of changing the chart pattern according to the level of noise in the printing paper sheet 24 used.

The system controller 272 determines printing conditions according to the correction value and/or algorithm determined by the control amount determining unit 220 and sends an instruction to the print controlling unit 274.

The print controlling unit 274 controls the printing operation of the inkjet head 72 according to the instruction from the system controller 272. To be specific, the print controlling unit 274 is a controlling unit that has a signal processing function of generating dot data, which is printing data used to control printing, from image data in the memory 290 according to the control by the system controller 272, and that supplies the generated printing data (dot data) to the head driver 278. Dot data is typically generated by subjecting multiple-tone image data to color conversion processing and halftone processing. Color conversion processing converts image data represented by, for example, RGB (e.g., 8-bit image data for each of the colors of RGB) to color data on the colors of ink used in the inkjet printer 10 (in this example, color data on KCMY).

Halftone processing uses dithering or the error diffusion method in order to convert color data on the colors generated by color conversion processing to dot data on the colors (in this example, dot data on KCMY).

Predetermined signal processing is performed in the print controlling unit 274 and the amount of ink droplets ejected from the inkjet head 72 and the timings of ejection of the ink droplets are controlled through the head driver 278 based on the acquired dot data. Thus, a desired dot size and dot arrangement can be achieved.

The print controlling unit 274 includes an image buffer memory (not shown in the drawing) in which image data, parameters, and other data are temporarily stored during image data processing performed in the print controlling unit 274. Alternatively, the print controlling unit 274 and the system controller 272 can be combined into one processor.

To summarize the flow of the process from the image input to the print output, image data to be printed is input from an external device via the communication interface 270 and then is stored in the memory 290. In this stage, image data on RGB, for example, is stored in the memory 290. In the inkjet printer 10, the input digital image should be converted to a dot pattern that is as true as possible to the grayscale (image density) of the input digital image by changing the density of fine dots of ink (color material) to be jetted and the dot size, in order to form a pseudo continuous grayscale image to human eyes. Accordingly, data on the original image (RGB) stored in the memory 290 is fed to the print controlling unit 274 via the system controller 272 and then is converted to dot data on each ink color by halftone processing using a threshold matrix or the error diffusion method or the like in the print controlling unit 274. To be specific, the print controlling unit 274 converts the input RGB image data to dot data of four colors of K, C, M, and Y. The dot data generated in the print controlling unit 274 is then stored in the image buffer memory (not shown in the drawing).

The head driver 278 outputs driving signals for driving actuators (e.g., piezoelectric elements) for individual nozzles in the inkjet head 72, according to printing data fed from the print controlling unit 274. The head driver 278 may include a feedback control system for regulating the drive conditions for the head.

When driving signals from the head driver 278 are fed to the inkjet head 72, ink is ejected from the respective nozzles. The printing paper sheet 24 is transported at a predetermined rate and ink ejection from the inkjet head 72 is controlled to form an image on the printing paper sheet 24. It should be noted that the inkjet printer 10 in this example employs a driving method in which the piezoelectric elements in the inkjet head 72 receive signals having driving voltage waveforms that differ from one head module to another, and the on/off of switching elements (not shown in the drawing) connected to the electrodes of the respective piezoelectric elements are switched in synchronization with the ejection timings for the nozzles, so that ink is ejected from the nozzles corresponding to the respective piezoelectric elements.

The display 230 includes a liquid crystal display panel or other display devices. The display 230 displays information on various settings, information on the occurrence of abnormal conditions, and other information related to the inkjet printer according to instructions from the system controller 272. The operating unit 232 may include a keyboard, a mouse, a touch panel, a track ball, or other input devices, or any appropriate combination thereof. Alternatively, the display 230 and the operating unit 232 may be combined into such a unit that, for example, the display 230 has a touch panel as a screen. The display 230 and the operating unit 232 function as a user interface. Information input through the operating unit 232 is fed to the system controller 272. The system controller 272 conducts various processing according to information from the operating unit 232.

The operator can input various information, specifically, input printing conditions, select a mode of image quality, input other settings, input/edit additional information, and search for information, by manipulating the operating unit 232 while looking at the items on the screen of the display 230. The operator can also check the entry and other information through the display 230. The display 230 functions as an error information notification device that shows error information in such a way that error information is displayed on the screen of the display 230 to indicate abnormal conditions when the occurrence of jam, abnormal conditions of the inkjet printer, or any print failure is detected. The user can check the entry and other information through the display 230 and therefore understand the conditions and operating states of the system, for example.

A combination of the system controller 272 and the control amount determining unit 220 corresponds to one mode of the "control device". The state detecting unit 210 corresponds to one mode of the "abnormal noise detecting device". The density correcting unit 240 corresponds to one mode of the "print density correcting device". The density unevenness correcting unit 242 corresponds to one mode of the "print density unevenness correcting device". The ejection failure correcting unit 246 corresponds to one mode of the "ejection failure correcting device". A combination of the system controller 272 and the display 230 corresponds to one mode of the "information notification device".

[Function of Inkjet Printer 10]

The inkjet printer 10 according to this embodiment executes the first to fifth functions described below in order to perform high-quality printing.

(1) The first function is a function of determining the state of the printing paper sheet. The first function determines the state of the printing paper sheet by quantifying noise from the state of the surface of the printing paper sheet, non-uniformity of the thickness of the printing paper sheet, and non-uniformity of paper fiber, based on information on the read image acquired by the inline sensor 90.

(2) The second function is a function of correcting the print density. Printing correction made by the second function is referred to as "print density correction".

(3) The third function is a function of performing correction for reducing print density unevenness. Printing correction made by the third function is referred to as "print density unevenness correction".

(4) The fourth function is a function of detecting the ejection state of the inkjet head and correcting image defects due to the detected ejection failure. The ejection state of the inkjet head refers to the ejection state of each nozzle. The ejection state of the inkjet head is referred to as "head ejection state". Detection of the head ejection state performed by the fourth function includes detection of ejection failure in each nozzle. Printing correction performed by the fourth function is referred to as "ejection failure correction". The fourth function includes "head ejection state detection" and "ejection failure correction".

(5) The fifth function is a function of determining failure in the printing results on the basis of the read image of the printing results based on individual printing data representing an image to be printed and, as needed, correcting the print failure. "Print failure determination" performed by the fifth function corresponds to a function of print quality inspection. Printing correction performed when the fifth function determines the presence of a print failure is referred to as "print failure correction". A printing determined to be a print failure by the fifth function is classified as a failed printing. It should be noted that the fifth function does not necessarily perform print failure correction. In other words, it is possible that only classification of printings is performed without correction processing after the detection of the print failure.

Among the first to fifth functions, the first function is used in combination with at least one of the second to fifth functions. In other words, information on the printing paper sheet obtained by the first function is used for the control of detection or correction performed by at least one of the second to fifth functions.

For the first function, information on the state of the surface of the printing paper sheet (i.e., information on noise on the surface of the printing paper sheet) can be obtained by analyzing the state where ink droplets are placed on the printing paper sheet, based on not only information acquired by reading an unprinted area on the printing paper sheet as it is but also read image information on test charts printed on the printing paper sheet by any of the second to fifth functions or print target images other than the test charts. Information on the state of the printing paper sheet that can be only revealed by analyzing the state where ink droplets are placed on the printing paper sheet is used for the first function and can also be used for detection or correction performed by the second to fifth functions.

For instance, information on noise from ink droplet interaction can be acquired from a read image read from a printing with a test chart and/or a print target image.

The first to fifth functions are required to read at least one of the printing paper sheet as it is, a first printing with a test chart, and a second printing with a print target image, and acquire image data on a read image. "Image data on a read image" is referred to as read data. In this embodiment, image data required to analyze noise from printing paper sheets is read by the inline sensor 90.

The state detecting unit 210 quantitatively detects the following states based on read data read by the inline sensor 90. "Quantitatively" refers to "in such a manner that a 'level' indicating the intensity of the state of each of the following objects to be detected, a 'density' and a 'spatial frequency component'" indicating a two-dimensional distribution on a printing paper sheet, and other elements are represented in values".

[Example of Method of Detecting Abnormal Noise on Printing Paper Sheet]

The average read value is simply determined as long as unevenness and surface roughness on the surface of a printing paper sheet or variations in the thickness of paper randomly affect read values given by the inline sensor 90 and these read values are normally distributed with an average read value. In reality, however, the read values affected by these variations do not normally distribute.

Figure 4:
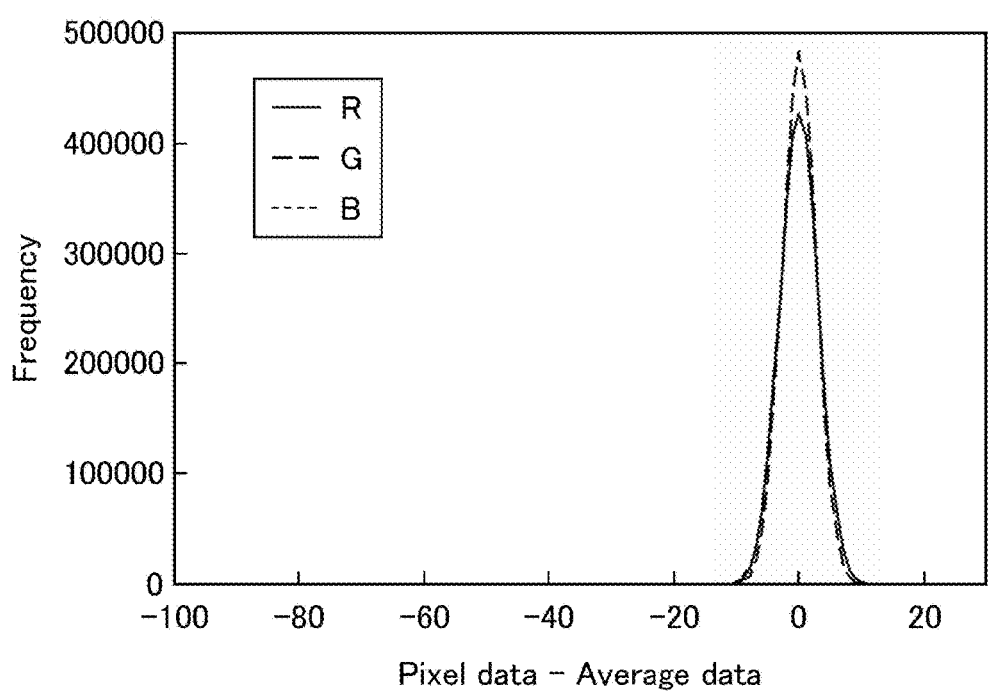
FIG. 4 is a graph illustrating a histogram of read data on a blank area on a printing paper sheet with a relatively low level of noise.
Figure 7:
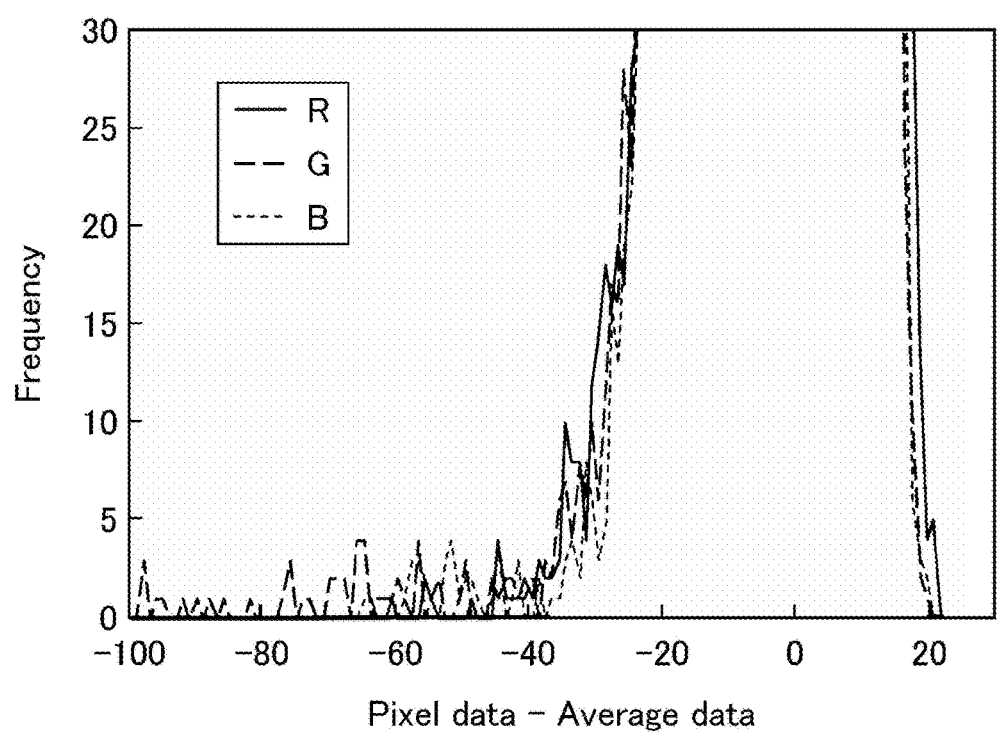
FIG. 7 is an enlarged graph in which the flared portions in the histogram of FIG. 5 are enlarged.

FIGS. 4 and 7 illustrate actual measurement data of noise on this type of printing paper sheet according to this embodiment. The graph of FIG. 4 is a histogram of a difference calculated between a read value in an on-paper blank area in a printing paper sheet with a relatively low level of noise, and an average read value in the on-paper blank area. An on-paper blank area refers to an unprinted area in a printing paper sheet and thus refers to a blank area in a printing paper sheet as it is. An average read value in an on-paper blank area refers to an average value (arithmetic mean) of read values in the on-paper blank area and thus refers to an average of read values in the on-paper blank area. An average read value in an on-paper blank area is synonymous with a "blank-read average value".

Figure 5:
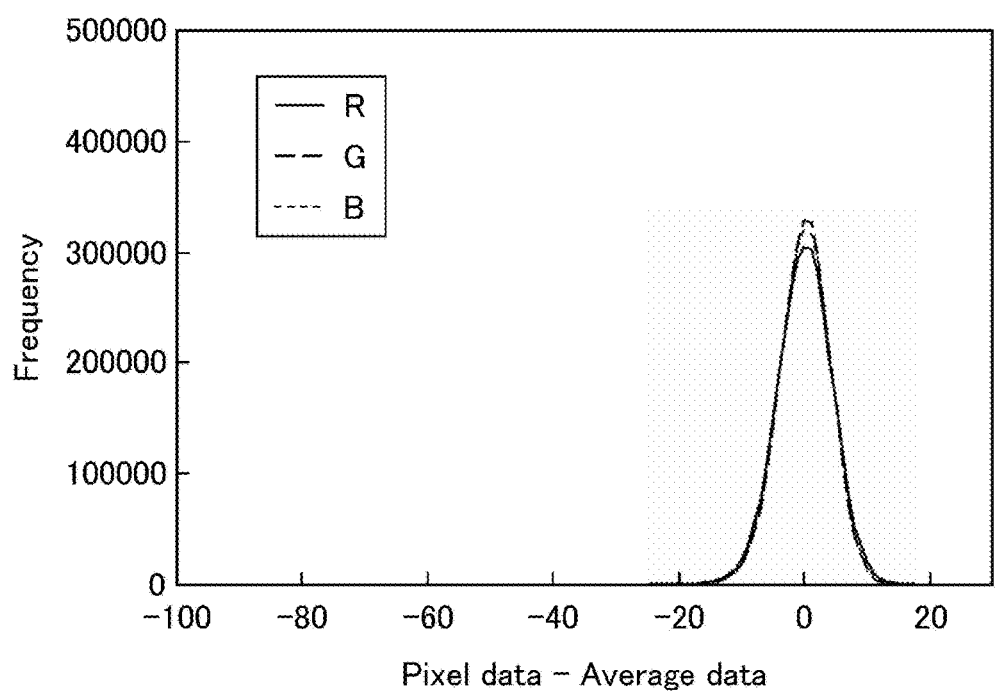
FIG. 5 is a graph illustrating a histogram of read data on a blank area on a printing paper sheet with a relatively high level of noise.

The graph of FIG. 5 is a histogram of a difference calculated between a read value in an on-paper blank area in a printing paper sheet with a relatively high level of noise, and an average read value in the on-paper blank area.

Since reading is performed with the color CCD linear image sensor 110 (see FIG. 2) as described above, the graphs of FIGS. 4 and 5 are histograms of three colors of R, G, and B. The horizontal axis (lateral axis) in each of the graphs of FIGS. 4 and 5 represents a value obtained by subtracting "an average read value in an on-paper blank area" from "a read value in the on-paper blank area" (the read value in the on-paper blank area—the average read value in the on-paper blank area). The value "0" along the horizontal axis corresponds to the average read value in the on-paper blank area. It should be noted that a pixel value of read data in this example is represented by 8-bit grayscale (a value within a range of 0 to 255) for each color. The vertical axis (longitudinal axis) in each of FIGS. 4 and 5 represents the number of pixels (frequency) each having a value of "a read value in the on-paper blank area—the average read value in the on-paper blank area".

Both of the graphs of FIGS. 4 and 5 show data on a blank area in a printing paper sheet 24 read in about 3.3 megapixels. Comparison between FIG. 4 and FIG. 5 demonstrates that the histogram of FIG. 5 related to the printing paper sheet with a high level of noise shows a lower peak because of the wide distribution in the histogram.

Although the graphs of FIGS. 4 and 5 do not apparently show any noise component, the flared portions in each histogram have noise components that can be recognized when flared portions are enlarged.

Figure 6:
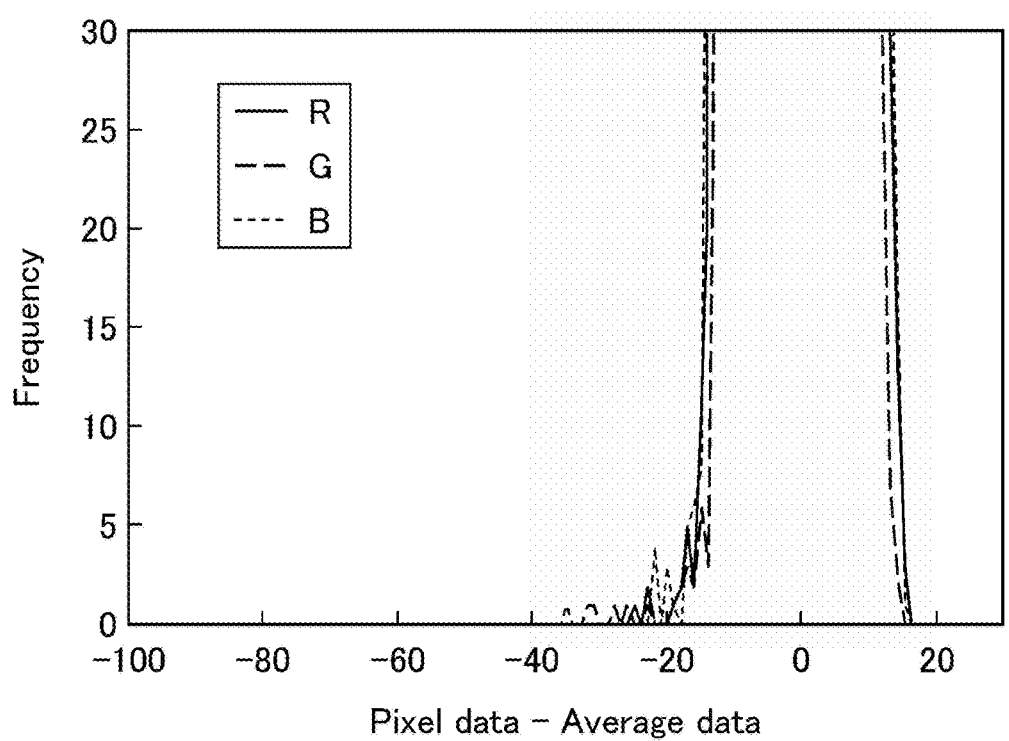
FIG. 6 is an enlarged graph in which the flared portions in the histogram of FIG. 4 are enlarged.

FIG. 6 is a graph in which the flared portions in the histogram of FIG. 4 are enlarged. FIG. 7 is a graph in which the flared portions in the histogram of FIG. 5 are enlarged. As is obvious from FIGS. 6 and 7, in both graphs, noise distributes more on the negative side with respect to the value 0 along the horizontal axis, and do not distribute equally on the positive and negative sides. This is because any of unevenness, foreign matter, surface roughness, and dirt on the surface of the printing paper sheet can be a cause of a reduction in read value (darkening). For this reason, simply averaging read values gives an average value deviating toward the dark side due to the effects of noise.

In the histogram of FIG. 6 showing the printing paper sheet with a low level of noise, there are only several pixels with absolute values exceeding "a read value in the on-paper blank area—the average read value in the on-paper blank area" of "30". In contrast, in the histogram of FIG. 7 showing the printing paper sheet with a high level of noise, there are a large number of pixels (in this embodiment, over 2 megapixels) with absolute values exceeding "a read value in the on-paper blank area—the average read value in the on-paper blank area" of "30". In FIG. 7, "a read value in the on-paper blank area—the average read value in the on-paper blank area" ranges down to "−98", showing that noise distributes extremely widely in both the pixel count and the value. Since the reading sensitivity of the inline sensor 90 is adjusted so that the read values in the on-paper blank area are maintained at about 200 in average, the fact that "a read value in the on-paper blank area—the average read value in the on-paper blank area" ranges down to "−98" shows presence of at least one pixel with a read value that is approximately half of the target average value achievable by adjusting the reading sensitivity. Besides, as described above, a majority of pixels look darker than those with an average value because of noise on a printing paper sheet.

FIGS. 8 to 11 two-dimensionally show the spatial distribution of this noise on a printing paper sheet.

Figure 8:
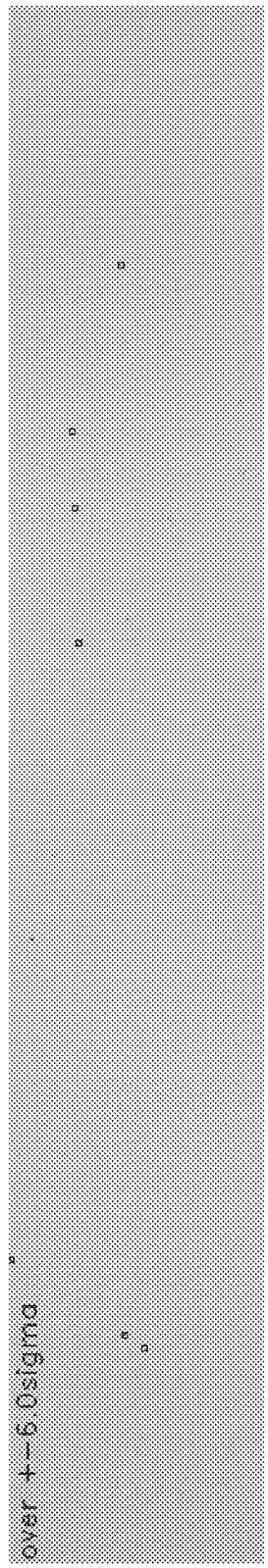
FIG. 8 illustrates an image read from an on-paper blank area, showing pixels with read values of +6σ or more of the average read value and −6σ or less of the average read value, for the same read data as in the histogram of FIG. 4.

FIG. 8 shows pixels with read values of +6σ or more of the average read value and −6σ or less of the average read value, based on the same read data in the histogram of FIG. 4. The symbol "σ" represents a standard deviation.

Figure 9:
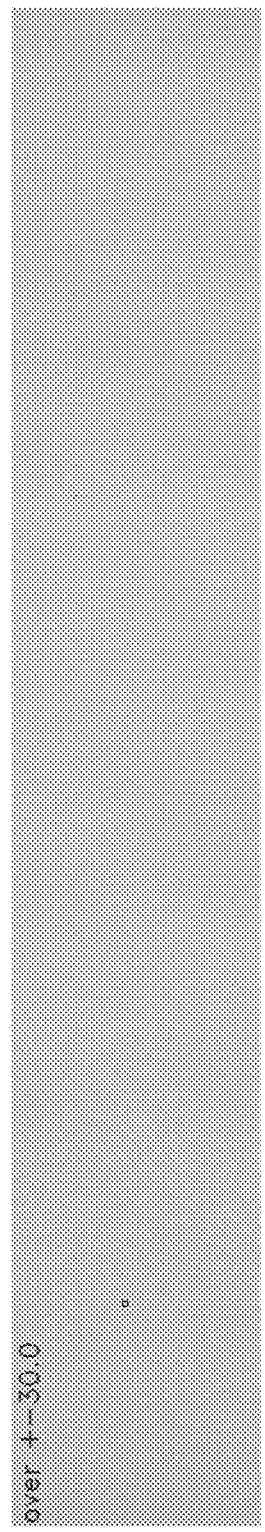
FIG. 9 illustrates an image read from an on-paper blank area, showing pixels with read values of +3σ or more of the average read value and −3σ or less of the average read value, for the same read data as in the histogram of FIG. 4.

FIG. 9 shows pixels with read values of +30 or more of the average read value and −30 or less of the average read value, based on the same read data in the histogram of FIG. 4.

Figure 10:
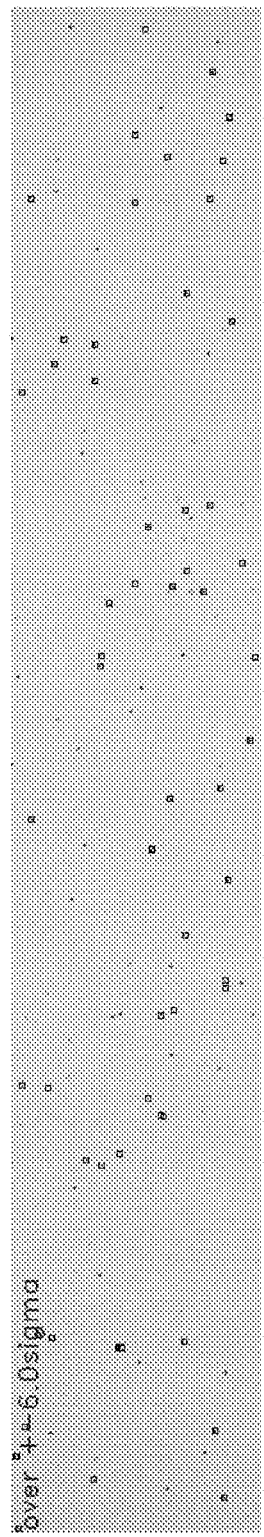
FIG. 10 illustrates an image read from an on-paper blank area, showing pixels with read values of +6σ or more of the average read value and −6σ or less of the average read value, for the same read data as in the histogram of FIG. 5.

FIG. 10 shows pixels with read values of +6σ or more of the average read value and −6σ or less of the average read value, based on the same read data in the histogram of FIG. 5.

Figure 11:
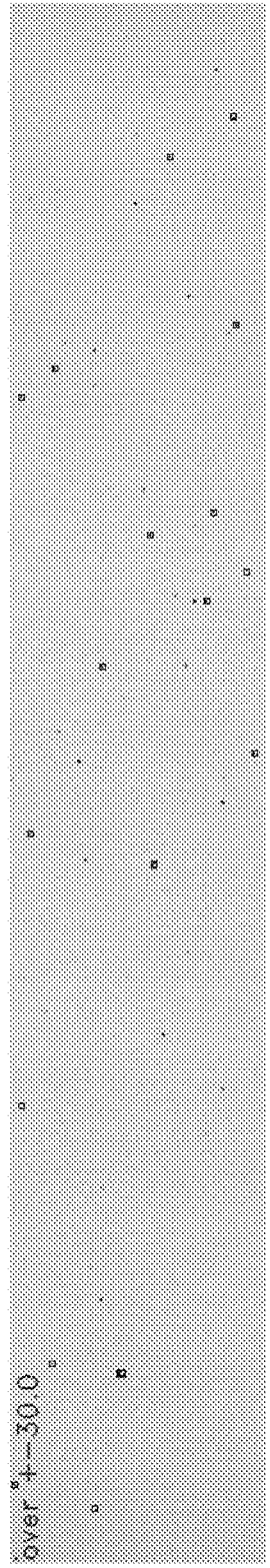
FIG. 11 illustrates an image read from an on-paper blank area, showing pixels with read values of +3σ or more of the average read value and −3σ or less of the average read value, for the same read data as in the histogram of FIG. 5.

FIG. 11 shows pixels with read values of +30 or more of the average read value and −30 or less of the average read value, based on the same read data in the histogram of FIG. 5.

Reading of the blank area in each printing paper sheet was performed in about 3.3 megapixels to cover almost the full width of each printing paper sheet. Referring to each of the FIGS. 8 to 11, there are small dots, dots slightly larger than the small dots, and small square portions. These represent pixels determined to be strong noise (abnormal noise) among data on each of the channels of R, G, and B obtained with the color CCD linear image sensor 110 (see FIG. 2). "Small dots" represent pixels determined to be strong noise among data read from R channels (pixels having the abnormal noise in R channels), "slightly larger dots" represent pixels determined to be strong noise among data read from G channels (pixels having the abnormal noise in G channels), and "small square portions" represent pixels determined to be strong noise among data read from B channels (pixels having the abnormal noise in B channels).

Defects, such as foreign matter that clearly appear on the surface of the printing paper sheet, are often detected as noise in the same pixel positions in all the R, G, and B channels. In contrast, pixels having the abnormal noise detected in only any one of the R, G, and B channels represent light-color portions that look semi-transmissive due to foreign matter under paper fiber, local asperities on the paper surface, and other defects.

As is obvious from comparison between FIG. 8 and FIG. 9 and comparison between FIG. 10 and FIG. 11, for both the printing paper sheet with a relatively low level of noise (the printing paper sheet in the histogram of FIG. 4) and the printing paper sheet with a relatively high level of noise (the printing paper sheet in the histogram of FIG. 5), "the sum of the pixels with values of +6σ or more of the average read value and −6σ or less of the average read value" is larger than "the sum of the pixels with values of +30 or more of the average read value and −30 or less of the average read value".

Two methods of setting thresholds for these determinations in this embodiment will now be explained. The first one is a method using a standard deviation σ. In the definition of the standard deviation σ, when individual values multiply a-fold, the standard deviation σ also multiplies a-fold. In addition, the average value of individual values also multiplies a-fold. When read values from a whole target image are substantially equal, as in the case of read values from a blank area on a printing paper sheet according to this embodiment and read values in a portion of a print image which has the same print density, the standard deviation a is generally proportional to the average value of individual values provided that the distribution forms of individual values are similar. Hence, use of the standard deviation a as a threshold leads to the extraction of a substantially constant proportion of pixels. Given these properties, determination with the standard deviation σ is preferably used for correction using an average read value, which is an average value of read pixels, for defects distributing in the entire paper surface. With the use of the standard deviation σ, the state of the paper surface can be easily observed with such a threshold that a larger number of target noise pixels are detected.

In contrast, determination using the absolute value of a difference between the average value and the value of each pixel, such as "pixels with values greater than or equal to the average read value +30 and pixels with values less than or equal to the average read value −30", is preferably used for correction susceptible to noise which is localized but has a large value, and thus uses a threshold corresponding to noise with a size that prevents the required accuracy for correction from being achieved.

In this embodiment, the value (|read value −average read value|=30) is used as a threshold (corresponding to one mode of the first threshold) because the accuracy of detecting errors in given positions for ejection state detection cannot be satisfied when the absolute value of a difference between the average read value and the read value exceeds 30.

[Parameters to be Quantified]

For "determination of the state of a printing paper sheet" using the first function, at least one of the level, distribution density, and/or spatial frequency of abnormality in read values is quantified. This abnormality is caused by defects on the surface and non-uniformity in paper thickness, such as asperities, foreign matter, surface roughness, and dirt on the surface of the printing paper sheet, and non-uniformity of paper fiber, which act as noise during reading. "Asperities on the surface of the printing paper sheet" refers to local asperities. On the contrary, "surface roughness" does not locally occur and appears in a similar value in any portion on the surface of the printing paper sheet.

For "print density correction" using the second function, at least one of the color reproduction and the density with respect to the amount of ejected ink is quantified. "Print density correction" is a function performed during color matching or density calibration.

For "print density unevenness correction" using the third function, at least one of the level, distribution, and spatial frequency of print density unevenness is quantified. This print density unevenness is caused by variations in ejection performance of each nozzle of the inkjet head 72 for printing, i.e., caused by the inkjet head 72 and has components in directions other than the paper sheet transport direction.

For "head ejection state detection and ejection failure correction" using the fourth function, at least one of the parameters on a pattern, which are local deviation, deformation, and density fluctuations, and the level and distributions of smearing on the printing paper sheet, is quantified based on read data acquired by reading the printing results of an ejection failure detection test chart which is a print pattern for detecting the ejection state and ejection direction accuracy of the inkjet head 72 for printing. It should be noted that the deviation of the pattern is quantified in a process of detecting ejection failed nozzles (e.g., non-ejection detection) during ejection failure correction. In this embodiment, in addition to the quantification for the detection of ejection failed nozzles, quantification of the parameters in the pattern, which are "local" deviation, deformation, density fluctuations and smearing on the printing paper sheet, is carried out, thereby allowing noise from printing paper sheets to be detected (which corresponds to the first function).

For "failure determination and failure correction of the printing results" using the fifth function, at least one of the dirt and foreign matter on the printing, density unevenness due to ejection failure in the inkjet head 72, and the level and distribution of defects is quantified by comparison between printing data to be printed and read data acquired by reading an actual printing based on that printing data. "Failure determination of the printing results" corresponds to a function of print quality inspection (so called product inspection) which is performed for general printing.

The control amount determining unit 220 described with reference to FIG. 3 conducts at least one of the control of the amount of correction in the printing operation of the inkjet head 72, and the change of the algorithm for calculating the amount of correction, based on the detection results given by the state detecting unit 210 (the detection results given by the first function) and at least one of the second to fifth functions, so that an appropriate correction value and algorithm can be determined.

The system controller 272 determines the printing conditions according to the correction value and/or algorithm determined by the control amount determining unit 220 and sends an instruction to the print controlling unit 274. The print controlling unit 274 controls the printing operation of the inkjet head 72 according to the instruction.

[Description of Parameters to be Quantified and an Example of Method for Correction]

Figure 12:
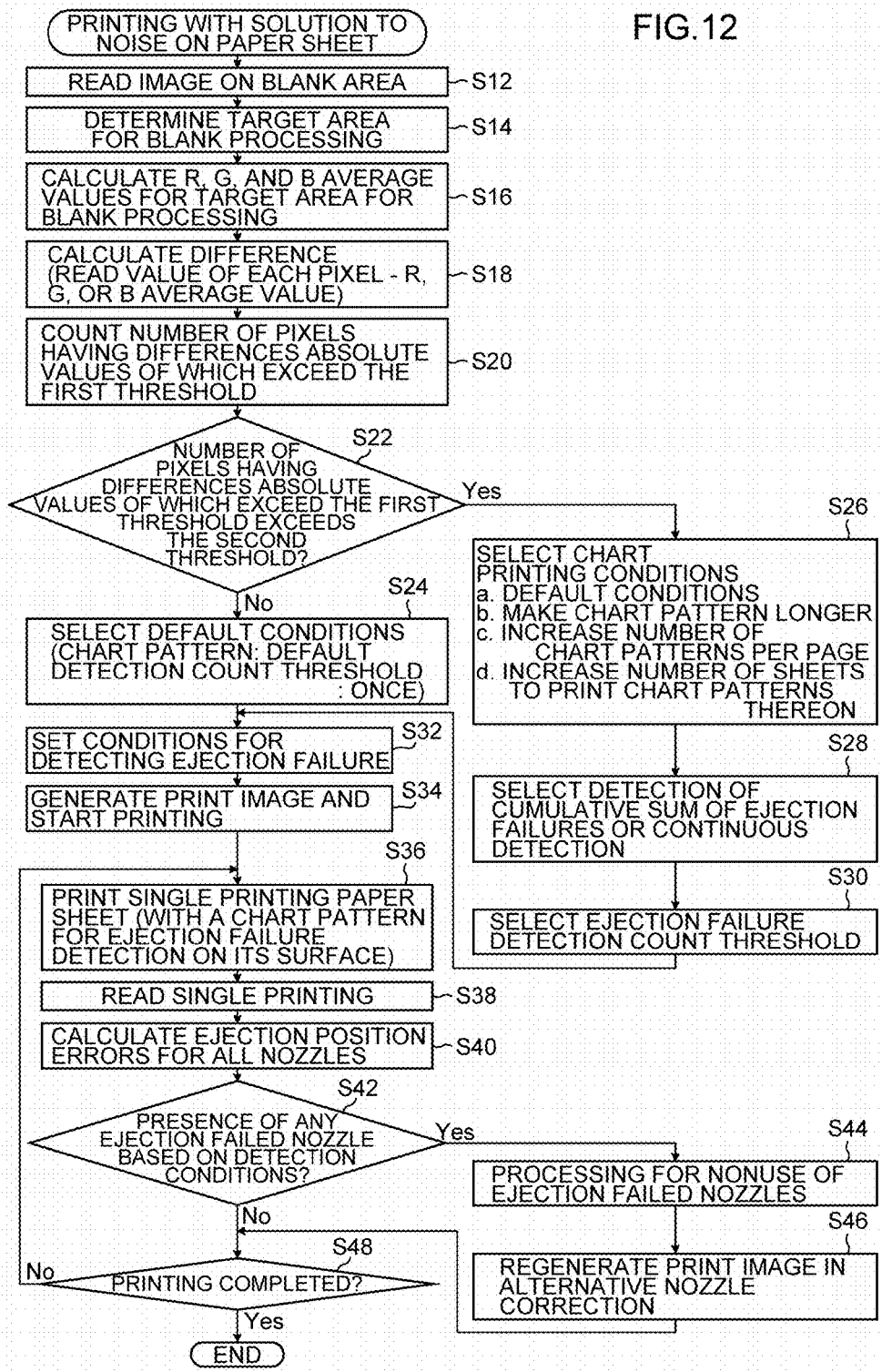
FIG. 12 is a flow chart showing an example control operation in a printing process in the inkjet printer.

FIG. 12 is a flow chart showing an example control operation during a printing process in the inkjet printer 10. In the example printing process in FIG. 12, the determination of the state of a printing paper sheet performed using the first function and "head ejection state detection and ejection failure correction" using the fourth function are used in combination. To be specific, the flow chart of FIG. 12 illustrates a method of controlling inkjet printing, in which the fourth function uses the results of the determination of the state of the printing paper sheet conducted with the first function in order to perform printing.

"Determination of the state of the printing paper sheet" is to quantify the level, distribution density, and/or spatial frequency of abnormal noise (referred to as "paper sheet noise") in read values. This abnormal noise is caused by defects on the surface of the printing paper sheet (e.g., surface asperities, foreign matter, surface roughness, dirt, or any combination thereof), non-uniformity in the thickness of the printing paper sheet, non-uniformity in paper fiber, and other factors. Quantification using the first function corresponds to a determination method of determining the amount of abnormal noise on the printing paper sheet.

The printing process shown in FIG. 12 is referred to as "printing with a solution to noise on a paper sheet". Upon initiation of the printing with a solution to noise on a paper sheet in FIG. 12, the inline sensor 90 reads a blank area on an actual printing paper sheet 24 (Step S12). Reading of the blank area is performed after printing, for example, a test chart for correction processing for any one of the second to fourth functions such that an area on the paper surface on which no ink is applied (an unprinted area) is read or such that the printing paper sheet is only transported as a blank sheet without printing for reading the blank area, and the blank area in the blank sheet (i.e., the printing paper sheet as it is) is read. Step S12 gives image data on the blank area on the printing paper sheet 24. Step S12 corresponds to one mode of "the optical reading step".

Figure 13:
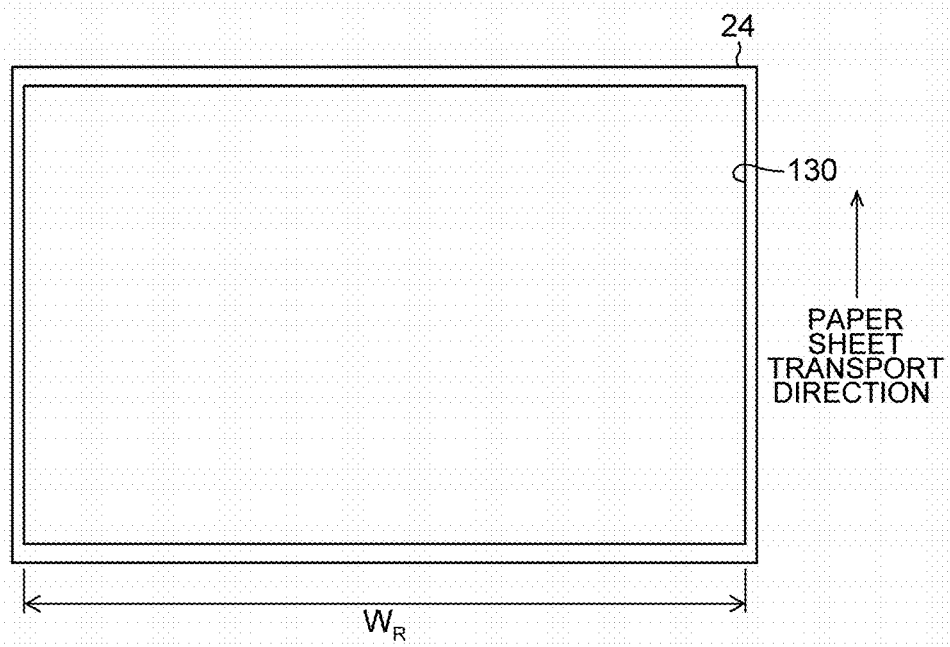
FIG. 13 is a plan view illustrating a blank area to be read on an unprinted printing paper sheet.

FIG. 13 illustrates a blank area 130 to be read from an unprinted printing paper sheet 24. The width $W_R$ of the blank area 130 to be read is equal to the reading width of the inline sensor 90. In this example, a large amount of read pixel data can be acquired from almost the entire printing paper sheet 24.

Figure 14:
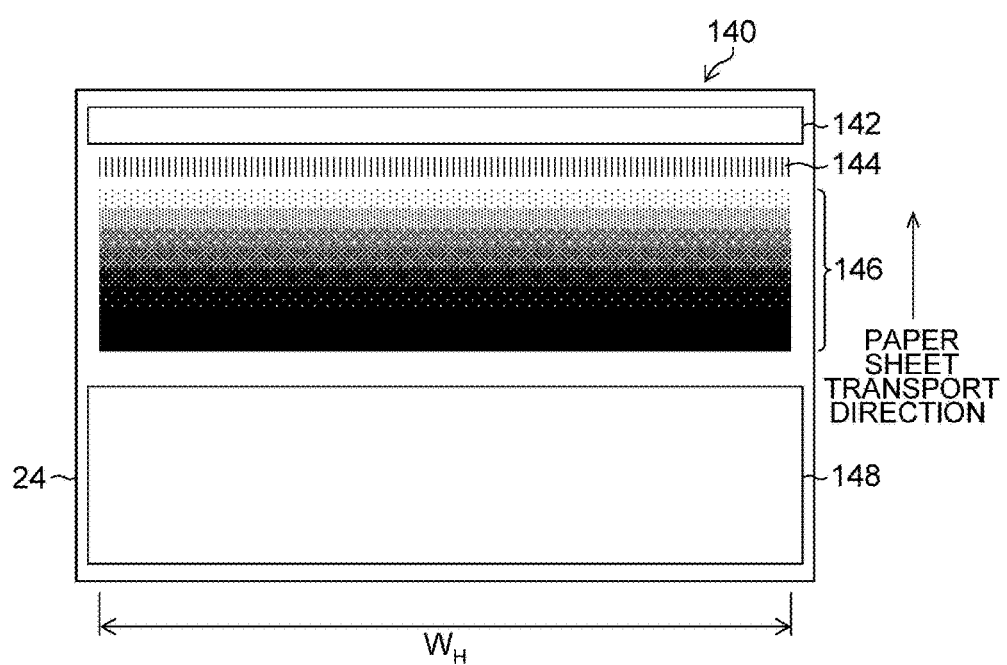
FIG. 14 is a plan view illustrating a blank area to be read in a printing on which a test chart for print density unevenness correction is printed.

FIG. 14 illustrates a blank area to be read in a printing 140 on which a test chart used for "print density unevenness correction" using the third function is printed. The printing 140 in FIG. 14 includes a first blank area 142 to be read, a head ejection state detection chart pattern 144, a print density unevenness correction chart pattern 146, and a second blank area 148 to be read. The printing 140 corresponds to one mode of "the first printing".

FIG. 14 shows two readable portions on the printing paper sheet 24: the first blank area 142 to be read and the second blank area 148 to be read.

The head ejection state detection chart pattern 144 is an area on which a chart pattern for detecting the ejection state of each nozzle in the inkjet head 72 is printed. A so-called "1 on n off" nozzle check pattern (see FIG. 15), for example, is printed on the head ejection state detection chart pattern 144.

The print density unevenness correction chart pattern 146 is an area on which a chart pattern for determining the amount of correction used for print density unevenness correction is printed. A density chart consisting of uniform density areas with grayscale values differentiated in stages is printed on the print density unevenness correction chart pattern 146. Each area of the density chart with the corresponding density stage corresponds to a "uniform density area".

The width $W_H$ of the head ejection state detection chart pattern 144 and the print density unevenness correction chart pattern 146 is equal to the maximum printable width (i.e., full length) of the inkjet head 72. Before execution of a printing job, the test chart shown in FIG. 14 is printed. The test chart shown in FIG. 14 is merely illustrative and different modes of test charts are applicable.

Each of the first blank area 142 to be read and the second blank area 148 to be read corresponds to one mode of "an unprinted area on a printing paper sheet". Each of the head ejection state detection chart pattern 144 and the print density unevenness correction chart pattern 146 corresponds to one mode of the "test chart printed area". Reading the test chart printing shown in FIG. 14 once allows read data on the blank area (unprinted area) and read data on the test charts to be acquired.

When the printing 140 shown in FIG. 14 is read with the inline sensor 90, image areas corresponding to the first blank area 142 to be read and the second blank area 148 to be read, which are target areas for on-paper blank processing, are determined based on data on the acquired read image (Step S14 in FIG. 12). When the blank sheet shown in FIG. 13 is read with the inline sensor 90, an appropriate area is determined as a target area for on-paper blank processing based on data on the acquired read image (Step S14 in FIG. 12). The read data on the target area for on-paper blank processing is then analyzed to reveal how noise is contained in the read data on the blank area on the printing paper sheet 24 (Steps S16 to S22).

The level of the noise is determined in the following manner: an average read value is determined based on the read image on the target area for on-paper blank processing, and the number of pixels is determined which have read values the absolute values of which are extremely away from the average read value.

In particular, R, G, and B average values for the target area for on-paper blank processing are calculated (Step S16) and a difference between the read value of each pixel and the R, G, or B average value is calculated (Step S18). Step S16 calculates the R average value which is an average value of the read values of all the pixels in the R channels in the target area for on-paper blank processing, the G average value which is an average value of the read values of all the pixels in the G channels in the target area for on-paper blank processing, and the B average value which is an average value of the read values of all the pixels in the B channels in the target area for on-paper blank processing. Here, average values of read values obtained from R, G, and B channels are denoted as "R, G, and B average values". Each of the R, G, and B average values corresponds to one mode of the "blank-read average value".

Difference calculation in Step S18 determines a difference for each of the R, G, and B channels by subtracting the R, G, or B average value from the read value of each pixel. A difference calculated by the expression "read value of each pixel—R, G, or B average value" corresponds to a "deviation" of the read value of each pixel from the average value.

Subsequently, the number of pixels having differences determined in Step S18 the absolute values of which exceed the first threshold is counted (Step S20). The first threshold relates to the absolute value of a deviation (difference) of a read value obtained from a blank area from a blank-read average value. "A pixel having a difference the absolute value of which exceeds the first threshold" is considered as abnormal noise from the printing paper sheets. Step S20 therefore corresponds to detection of pixels with abnormal noise in the target area for on-paper blank processing. Step S20 corresponds to one mode of "abnormal noise detecting step".

Subsequently, whether "the number of pixels having differences the absolute values of which exceed the first threshold" counted in Step S20 exceeds the second threshold is determined (Step S22). The second threshold is a threshold of a pixel count for determination of noise level. The "noise level" is quantitative evaluation of the amount, proportion, distribution of abnormal noise from the state of a printing paper sheet, or any combination thereof and corresponds to one mode of the "state of abnormal noise".

To explain this further with another example, when pixels are read with the color CCD linear image sensor 110 with a value proportional to the brightness of the paper surface with a resolution of 8 bit for each pixel, each pixel value (read value) for each of the R, G, and B colors is within a range of 0 to 255. Since the white level of each printing paper sheet differs depending on the type of paper sheet or lot and even differs within one sheet, the reading conditions are adjusted so that a standard printing paper sheet can exhibit a pixel value of about 200. When a color sensor is used, one pixel exhibits a read value for each of the three colors of R, G, and B.

[First Method Related to Determination of Noise Level]

For example, in a first method related to determination of noise level, a pixel with a read value that differs by 30 or more from an average read value (corresponding to one of the "R, G, and B average values") for a blank area in a printing paper sheet under such reading conditions is determined to be a pixel with an absolute read value extremely away from the average value, and the total number of such pixels (the number of such pixels) is determined. In other words, when the average read value in the blank area is 200, the total number of pixels with read values of 170 or less or 230 or more is determined. In this example, the first threshold is defined as an "absolute value of a difference" of "30". An "absolute value of a difference" serving as the first threshold can be adjusted as appropriate according to the properties of the inkjet printer or the correction used.

When a large number of pixels are detected which have absolute read values that differ by the first threshold or more from the average read value in a blank area in this method, the cause is foreign matter or dirt in many cases. Accordingly, if this method determines that there is much noise, it is effective to control the amount of correction during correction processing which is susceptible to foreign matter and dirt. In this embodiment, this is particularly effective in "head ejection state detection and ejection failure correction" using the fourth function and "failure determination and failure correction performed by reading the printing results in printing data for each printing" using the fifth function. FIG. 12 illustrates the case where this is applied to "head ejection state detection and ejection failure correction" using the fourth function.

How to control the amount of correction will now be explained. "Head ejection state detection and ejection failure correction" using the fourth function will be first roughly described.

[Control of Amount of Correction in Ejection Failure Correction]

Figure 15:
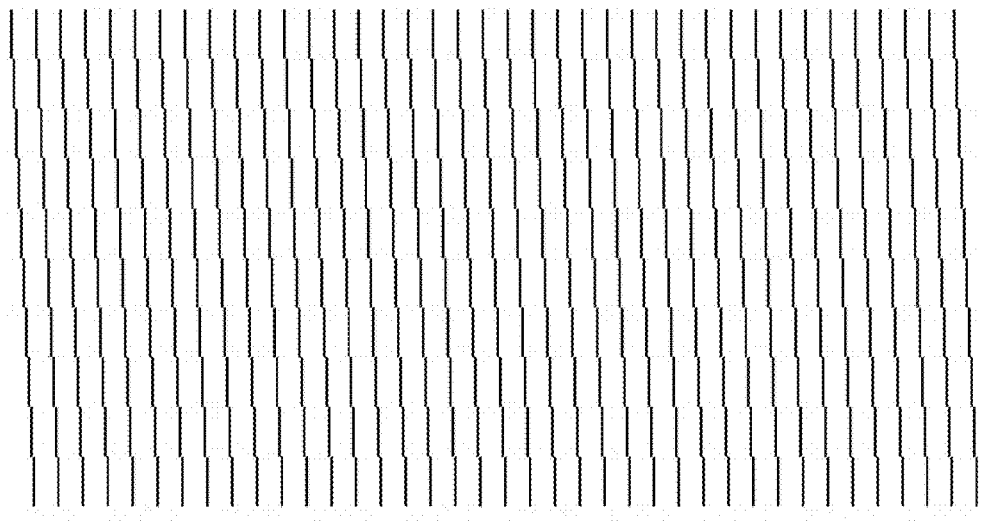
FIG. 15 illustrates a test chart used for head ejection state detection.

FIG. 15 illustrates a test chart used for head ejection state detection. The test chart in FIG. 15 corresponds to one mode of the "ejection failure detection test chart". FIG. 15 is a so-called 1 on n off chart pattern (FIG. 15 illustrates 1 on 9 off chart pattern) in which the longitudinal lines are line segments printed by the respective nozzle in the inkjet head 72 that perform continuous ejection independently of one another. To be specific, the position of each printed line indicates ejection positions (droplet positions) onto which droplets are ejected from the corresponding nozzle. An ejection position error in a nozzle can be measured by specifying the position of the line printed by that nozzle, based on the image read from the chart pattern in FIG. 15. An ejection position error is synonymous with "droplet position error" or "record position error" and refers to a deviation of a droplet position from an ideal droplet position in view of the design.

With the fourth function, a line chart pattern (detection pattern) for measuring ejection position errors shown in FIG. 15 is printed, the printing results of this chart pattern are read with the inline sensor 90, and an ejection position error is determined for each nozzle based on the acquired read data.

A nozzle with the determined ejection position error exceeding an ejection position error threshold is determined to have ejection failure. The ejection position error threshold is a "failure determining threshold" for determine whether a nozzle is an ejection failed nozzle, and corresponds to one mode of the "detection threshold". An ejection failed nozzle, which has been determined to have ejection failure, is not supposed to be used for printing and requires ejection failure correction such as printing with an alternative nozzle. Ejection failure correction is also referred to as "alternative nozzle correction" or "non-ejection correction".

For determination of ejection failed nozzles, the determination method is changed when the number of pixels having "absolute values of differences", which have been described above for Step S22, exceeding the first threshold is greater than the second threshold.

The second threshold can be set such that, for example, the determination method is changed for a printing paper sheet including, per unit area, a predetermined number or more (e.g., 0.6 pixels/cm$^2$) of "pixels having differences exceeding the first threshold" determined in Step S20 in FIG. 12. The term "0.6 pixels/cm$^2$" refers to a distribution density of 0.6 pixels per square centimeter. The value of 0.6 pixels/cm$^2$ is merely illustrative. In the flow chart of FIG. 12, when a chart pattern (detection pattern) having a length of 1 cm along the paper sheet transport direction orthogonal to the long side of a printing paper sheet of a 515 mm×728 mm paper sheet size (B2 size according to Japan Industrial Standards) is printed along that long side, the second threshold is set such that the number of noise pixels exceeding the first threshold does not exceed 50. Whether there are a large number of pixels exceeding the first threshold (that is, pixels having the abnormal noise) (Step S22) may be determined per unit area as described above or using a proportion (percentage) of pixels having the abnormal noise. For example, a threshold (the third threshold) related to the proportion of pixels having the abnormal noise is predetermined, and when the proportion of pixels having the abnormal noise exceeds the third threshold on a printing paper sheet, the printing paper sheet may be determined to be "a printing paper sheet with much noise".

In another possible determination method in Step S22, the density level of pixels having the abnormal noise is quantified. For example, for every pixel having the abnormal noise, a distance from one pixel having the abnormal noise to the adjacent pixel having the abnormal noise is defined as a minimum distance for that pixel having the abnormal noise. The density level of pixels having the abnormal noise can be quantified by determining a minimum distance for every pixel having the abnormal noise and then an average minimum distance. When the average minimum distance between pixels having the abnormal noise (average distance) is smaller than a predetermined distance, the density level can be determined to be high. By this method, for every pixel exceeding the first threshold, the average of a minimum distance between them is determined to quantify the density level of pixels exceeding the first threshold, and when the average distance is smaller than the predetermined distance, it may be determined that there are a large number of pixels exceeding the first threshold. The "predetermined distance" here corresponds to a threshold for determining the density level (a fourth threshold). A density level can be considered as "density". It should be noted that "pixels exceeding the first threshold" refer to "pixels having differences the absolute values of which exceed the first threshold" determined in Step S20.

Since "determination of ejection failed nozzles" using the fourth function can detect ejection failed nozzles, "determination of ejection failed nozzles" can be considered as "detection of ejection failed nozzles". In other words, "a determination method" corresponds to "a method of detection".

The determination method can be changed by changing the chart pattern used for detection, by changing the determination algorithm or determination conditions, or by changing any combination thereof. A "determination algorithm" corresponds to "detection algorithm", and "determination conditions" correspond to "detection conditions".

To change the chart pattern, the number of printing paper sheets consumed in printing is increased in some cases. It is therefore preferable that the operator predetermine the priority of selection from candidate parameters which are changeable, the resulting setting information (information on the priority of selection) be stored in the memory 290, and the system controller 272 and the inline sensor controlling unit 200 control selection of a chart pattern according to the setting information on the priority stored in the memory 290.

In the flow chart of FIG. 12, if Yes is selected in Step S22, the process proceeds to Step S26 to perform selection of chart printing conditions. To be specific, a method of first changing the chart pattern is selected as an approach for changing the determination method.

As the candidates of chart printing conditions, the following four candidates are prepared: (a) default conditions, (b) make each chart pattern longer, (c) increase the number of chart patterns per page, and (d) increase the number of sheets to print chart patterns on. In Step S26, any of these four candidates is selected. It should be noted that "the number of sheets to print chart patterns on" corresponds to "the number of test chart printing operations".

The candidate (a) "default conditions" are an output mode for a default chart pattern and involve no change in the chart printing conditions. Even after "default conditions" are selected, the determination method can be changed by selections in Step S28 and Step S30. On the contrary, the following three candidates (b), (c) and (d) are methods for changing the chart printing conditions. For printing paper sheets, the probability that abnormal noise is present in an area occupied by one line, corresponding to one nozzle, in a line chart pattern used to determine a nozzle with an ejection failure is relatively low; therefore, the effects of noise can be reduced by averaging.

The following three candidates employ different averaging methods. The candidate (b) "make each chart pattern longer" refers to a mode in which each printed chart pattern is longer than a default chart pattern in the paper sheet transport direction. To be specific, the line chart pattern used to determine nozzles with ejection failures is made longer in the paper sheet transport direction. This reduces the effects of paper sheet noise. The candidate (c) "increase the number of chart patterns per page" is to increase the number of chart patterns printed on one page to a number larger than that for default chart patterns. For example, when the same chart pattern is printed on one page more than once, the number of repetitions of the printing is increased. Printing the same chart pattern more than once on one printing paper sheet (one page) reduces the effects of paper sheet noise. The candidate (d) "increase the number of sheets to print chart patterns on" is to increase the number of sheets to print chart patterns on to a number larger than that in the default conditions. Printing the same chart pattern on a plurality of printing paper sheets reduces the effects of paper sheet noise.

In the chart printing conditions selecting step in Step S26, the operator predetermines the priority and the selection is automatically performed according to the predetermined priority.

Subsequently, the determination algorithm and/or the determine conditions are changed. In this example, detection of the cumulative sum of ejection failures and continuous detection are prepared as candidates for the determination algorithm, and the cumulative sum of ejection failures or continuous detection is selected in Step S28.

Under the default conditions for detecting ejection failure detection, when an ejection position error in one nozzle exceeds the ejection position error threshold, that nozzle is determined to have an ejection failure. To be specific, under the default detection conditions, upon detection of an ejection position error exceeding the ejection position error threshold, that nozzle is immediately determined to have an ejection failure from the results of this single detection of excess of the ejection position error threshold.

On the contrary, "cumulative sum detection" is an algorithm that counts the number of times that the same nozzle is determined to have a failure with an ejection position error exceeding the ejection position error threshold, and determines that the nozzle has an ejection failure when the total number exceeds a predetermined detection count threshold (e.g., twice).

"Continuous detection" is an algorithm that counts only the number of times that the ejection position errors in the same nozzle, which occur in sequence as the chart patterns are printed, exceed a failure nozzle determination threshold in a row, and determines that the nozzle has an ejection failure when the number of times that these ejection position errors exceed the failure nozzle determination threshold in a row exceeds the predetermined detection count threshold. Continuous detection is an algorithm that is less susceptible to noise from printing paper sheets than cumulative sum detection.

The detection count threshold serving as a detection reference in cumulative sum detection and continuous detection can be set to any number without being limited to a predetermined particular number (e.g., twice). In Step S30, an ejection failure detection count threshold conforming to the algorithm selected in Step S28 is selected. A detection count threshold corresponds to one mode of the "detection threshold".

A combination of selections from Steps S26 to S30 determines conditions for detecting ejection failure. Detection conditions less susceptible to noise from printing paper sheets can be selected by an appropriate combination of selection of chart printing conditions in Step S26, selection of an algorithm for determination (cumulative sum detection or continuous detection) in Step S28, and selection of an ejection failure detection count threshold in Step S30. After Step S30, the process proceeds to Step S32 in which conditions for detecting ejection failure are set.

Examples of typical detection conditions set through Steps S26 to S30 when it is determined that there is much noise on the printing paper sheet in Step S22 include, as described above, an algorithm that makes each chart pattern longer, an algorithm that increases the detection count threshold of the number of times that ejection position errors exceed the ejection position error threshold, and an algorithm that determines the presence of an ejection failure upon excess of the detection count threshold when not cumulative sum detection but continuous detection is used.

If No is selected in Step S22, the default conditions are selected as ejection failure detection conditions (Step S24). In the default conditions related to chart printing conditions, a predetermined default chart pattern is designate as a chart pattern to be printed and the detection count threshold is set to once. After Step S24, the process proceeds to Step S32 in which the conditions for detecting ejection failure are set.

A print image is then generated and printing is started (Step S34). In Step S36, a single printing paper sheet is subjected to printing. Printing in Step S36 includes a step of printing a chart pattern for ejection failure detection on the surface of the printing paper sheet. Printing in Step S36 includes a step of printing an image based on printing data designated to be printed. In printing an image based on printing data designated to be printed, an ejection failure detection test chart pattern and the image based on the printing data designated to be printed are printed on the surface of the printing paper sheet. The ejection failure detection test chart is printed in a margin area (a margin area in a top or bottom portion in the paper sheet transport direction, or in both of these portions) out of the printing area of the image based on the printing data designated to be printed.

A single printing with the print image printed thereon is then read (Step S38) and ejection position errors are calculated for all the nozzles, based on read data on the ejection failure detection chart pattern (Step S40).

The results of calculation of the ejection position errors for all the nozzles given in Step S40 are used for a determination method under ejection failure detection conditions to determine presence or absence of any ejection failed nozzle (Step S42). If presence of any ejection failed nozzle is determined in Step S42, the process proceeds to Step S44 in which processing for nonuse of ejection failed nozzles is performed. In the processing for nonuse of ejection failed nozzles, ejection failed nozzles are made unusable (i.e., non-used) for printing.

After the processing for nonuse of ejection failed nozzles (Step S44), alternative nozzle correction is conducted so that a nozzle alternative to the ejection failed nozzle can perform alternative printing and a print image is regenerated in the alternative nozzle correction (Step S46).

After Step S46, the process proceeds to Step S48. If no ejection failed nozzle is detected in Step S42, the process proceeds to Step S48. In Step S48, whether printing ends is determined. If the printing is continued, No is selected in Step S48 to return to Step S36. If the printing ends in Step S48, the flow chart of FIG. 12 ends.

In this example, Steps S26 to S30 in which the detection conditions are changed from the default conditions correspond to one mode of the "control step" of changing the "setting related to detection". The algorithm of cumulative sum detection or continuous detection described for Step S28 corresponds to one mode of the "detection algorithm". Ejection failure correction can be understood as correction processing concurrently performed with ejection failure detection, and the algorithm of cumulative sum detection or continuous detection described for Step S28 can be understood as corresponding to one mode of the "correction algorithm" that defines correction conditions.

The detection count threshold serving as a detection threshold is changed in the flow chart of FIG. 12. Alternatively, or in combination with this, the ejection position error threshold may be changed. When a nozzle with an ejection position error exceeding the ejection position error threshold is detected, that ejection failed nozzle is subjected to ejection failure correction; therefore, the "ejection position error threshold" serves as a threshold that defines correction conditions for ejection failure correction. The ejection position error threshold can therefore be understood as corresponding to one mode of a threshold used for correction.

In the flow chart of FIG. 12, distribution density information on "noise" which is abnormal optically read values due to defects on the surface of the printing paper sheet is used for the control of the correction method. This is a relatively complex determination method (detection method). A simple determination method can be used instead which uses the maximum value and/or the minimum value in noise distribution. The determination method using the maximum value and/or the minimum value, however, is largely affected by the results that accidentally occurred in one pixel, which hinders stable control. Therefore, the method according to this embodiment is more advantageous for more stable control.

<Method of Controlling Inkjet Printing According to Second Embodiment>

An example of the control provided by a combination of the first function and the fifth function will now be explained. In print failure determination and failure correction using the fifth function performed by reading the printing results in printing data for each printing, a difference image indicating a difference between data is calculated by comparison of read data on each printing with original image data that has been used for the printing or read data on a printing that has been correctly printed during preliminary test printing. Presence or absence of streaks and other density unevenness due to dirt on printings or ejection failures in inkjet heads are then determined based on the obtained difference image, and presence or absence of any defect having a size greater than or equal to an eighth threshold or any portion that has a density difference greater than or equal to the ninth threshold, or any portion that has a density difference greater than or equal to a ninth threshold and has an area greater than or equal to a tenth threshold is determined. The eighth threshold is a threshold of the size of an image defect. The ninth threshold is a threshold of density difference. The tenth threshold is a threshold of area. Such determination of print failure, which is the inspection of the quality of printing, is a process generally called "product inspection".

This print failure determination is also affected by noise from printing paper sheets. Accordingly, for a printing paper sheet including, per unit area, a predetermined number or more of pixels (e.g., 0.6 pixels/cm² or more) having the absolute values of differences, each obtained by subtracting an R, G, or B average value from a read value in a blank area (see Step S18), exceed the first threshold, the threshold (the eighth threshold) of size of a defect, serving as a reference for determining a failure in a printing is increased or the threshold (the ninth threshold) of density difference between a correct image and an inspected image is increased.

For example, when the threshold (the eighth threshold) of size of a defect is set to 0.5 mm for standard paper such that a printing with a defect greater than or equal to 0.5 mm is determined to be a failure, the eighth threshold is changed to 0.75 mm for printing paper sheets with much noise such that a printing with a defect greater than or equal to 0.75 mm is determined to be a failure.

When the threshold (the ninth threshold) of density difference is increased, the average value of the absolute values of density differences of pixels exceeding the threshold of density difference is determined. Print failure determination is performed with a new threshold (ninth threshold) determined by adding a k-fold multiple of the average value to the threshold of density difference. Here, k is any number larger than 0, the appropriate value of which changes according to the printer used and the characteristics of ink. In this example, when the state of the surface of the printing paper sheet is so poor that the ninth threshold should be changed, the appropriate number for k is set to around 1, considering that many pixels exceeding the ninth threshold appear on a relatively wide area. Each of the eighth to tenth thresholds corresponds to one mode of the "detection threshold".

Examples of the control given when the fifth function detects a print failure include a mode of controlling a transport system that switches the destination to which failed printings are ejected, a mode of stamping failed printings, and a mode of giving an alarm about a printing with print failure to the user.

[Second Method Related to Determination of Noise Level]

In another method of determining a noise level (the second method), average values of read values on a blank area (R, G, and B average values) and a standard deviation ($\sigma$), which are determined from an image read from the blank area on a printing paper sheet, are used. For example, the total number of pixels of +6$\sigma$ or more of the average read value and −6$\sigma$ or less of the average read value is determined. 6$\sigma$ is a threshold corresponding to the first threshold. It should be noted that 6$\sigma$ and any other n-$\sigma$ threshold can be adjusted as appropriate according to the properties of the inkjet printer or correction used.

On a printing paper sheet with a large total number of pixels of +6$\sigma$ or more of the average read value and −6$\sigma$ or less of the average read value, such abnormal noise in pixels is often caused by asperities or surface roughness on the paper sheet surface. This is because presence of unevenness or roughness of the entire surface of a printing paper sheet inevitably increases $\sigma$.

To detect noise components distributed relatively uniformly on the entire surface of the paper surface, it is preferable that the average value and a be used for determination as in this second method. These noise components tend to be distributed unevenly in pixels that are bright and dark with respect to an average read value in the blank area and distributed more in dark pixels. Comparison with the paper surface free from such noise therefore proves that such noise affects the average value. Asperities and/or roughness of the surface of a printing paper sheet with these characteristics affect any type of printing correction, particularly correction using any average value because they tend to deviate the average read value. Accordingly, for the correction using any average read value, the amount of correction is preferably controlled.

In this embodiment, the above applies particularly to "print density correction" using the second function and "print density unevenness correction" using the third function. The operations for print density correction and print density unevenness correction will be roughly explained below.

[Print Density Correction]

In "print density correction" using the second function, a plurality of test charts with densities and colors are printed, the density and/or color of each chart is read in a plurality of pixels, and an average of read values of the pixels on the same chart serves a measurement value. Each density and/or color, that is, the amount of ink ejected during printing is corrected such that this measurement value corresponds to a target predetermined density or color.

Figure 16:
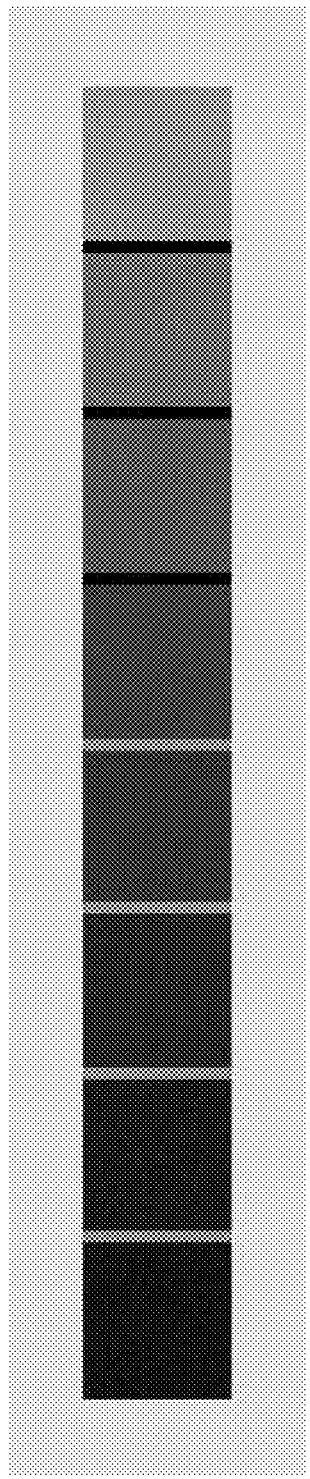
FIG. 16 illustrates a test chart used for print density correction.

FIG. 16 illustrates a test chart used for print density correction. The test chart in FIG. 16 corresponds to one mode of the "print density correction test chart". The test chart in FIG. 16 is for black ink, although a chart in this mode is also used for other colors of ink. FIG. 16 shows a density chart with solid image strips of eight print density stages, although the number of density stages is not limited thereto.

Print density correction is performed once or repeated a plurality of times. In particular, a chart with a plurality of densities or colors is preliminarily output and read and, if a measurement value does not correspond to a predetermined density or color, correction is performed based on the read results. After correction, the chart with the plurality of densities or colors is printed and read again, and correction is performed as needed. This process is repeated until the chart with the plurality of densities of colors exhibits measurement values corresponding to predetermined densities or colors.

In the inkjet printer, print density correction is accomplished by adjusting the amount of print ink. The amount of ink can be adjusted by changing the ink droplet size or the number of ink droplets ejected onto a unit area. In the inkjet printer according to this embodiment, the amount of ink is adjusted by changing the number of ink droplets ejected onto a unit area.

"Print density correction" using the second function enables printing with desired densities and colors and reveals a relation between the amount of ejected ink and color reproduction density.

[Print Density Unevenness Correction]

"Print density unevenness correction" using the third function is aimed at avoiding density unevenness in printing where all the nozzles, which are provided along the full width of the line inkjet head, produce the same density. To accomplish this, solid image strips, which have a predetermined length along the paper sheet transport direction orthogonal to the head width, are first printed with the nozzles provided along the full width of the inkjet head.

Figure 17B:
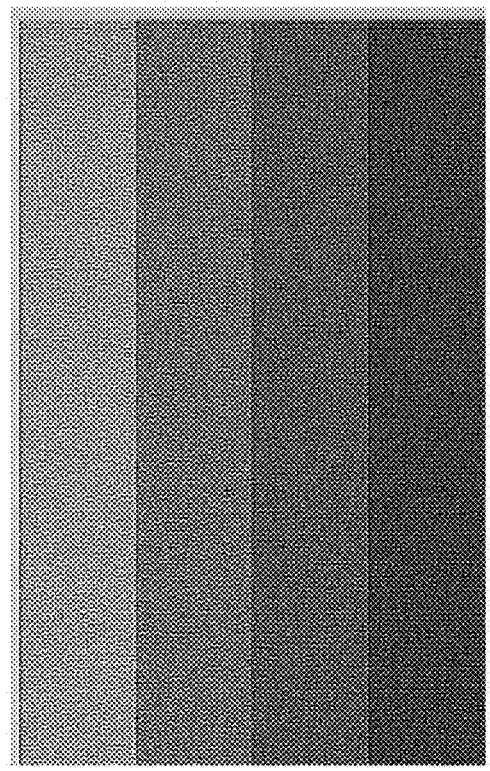
FIG. 17B is a diagram in which the noise in the read image in FIG. 17A is emphasized.
Figure 17A:
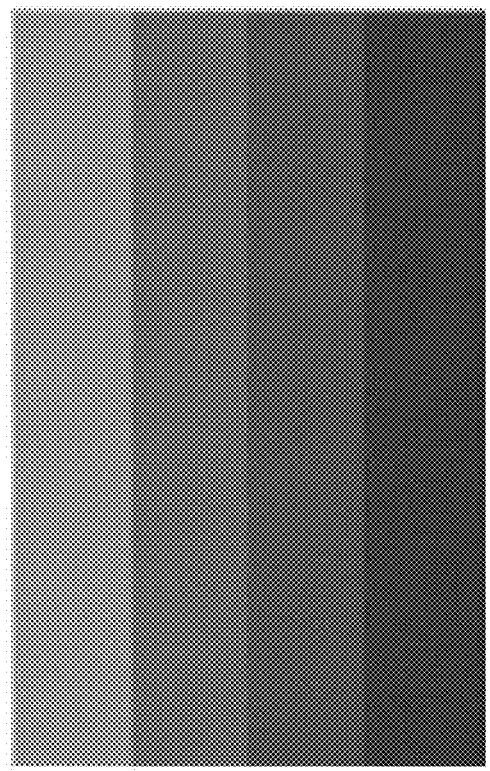
FIG. 17A shows a part of an image read from a printing on which a test chart used for print density unevenness correction is printed.

FIG. 17A shows a part of an image read from a printing on which a test chart used for print density unevenness correction is printed. The test chart in FIG. 17A corresponds to one mode of "print density unevenness correction test chart". The test chart in FIG. 17A is for black ink, although a chart in this mode is also used for other colors of ink. FIG. 17A shows a density chart with solid image strips of four print density stages, although the number of density stages is not limited thereto. Each solid image strip with the corresponding density corresponds to a "uniform density area".

A correction method using the basic solid image strip with the highest density in FIG. 17A will now be explained.

The solid image strip with the highest density has a density at or around the density Da which will be described later. After printing, the solid image strip with the highest density is read. The amount of density correction that makes the density of the read solid image uniform is determined for each nozzle position. The amount of density correction is calculated in the following manner Here, the density D which is commonly known can be defined by the equation of $D = \log_{10}(1/R)$, where R is the reflectivity of the printing. In this definition, the density is infinite when the reflectivity is 0.

The density Dn at which printing is performed using each nozzle is determined by averaging the pixel values read along a predetermined length extending in the paper sheet transport direction and corresponding to each nozzle position. Here, "n" in the density Dn represents a nozzle number. Conversion of a pixel value (i.e., read value) in a read image to a density is performed in the following manner. As described with reference to FIG. 2, the inline sensor 90 contains the white reference plate 116 the reflectivity of which is known. In addition, the color CCD linear image sensor 110 contained in the inline sensor 90 gives an output proportional to the brightness of a captured image. Reading the white reference plate 116 the reflectivity of which is known with the color CCD linear image sensor 110 allows read values to be acquired at a reference reflectivity. Moreover, a density can be determined from a ratio between the read values. The details are shown below.

The reflectivity of the white reference plate (known): Rr
The read value of the white reference plate (known): Ar
The reflectivity of a chart with a density to be determined (unknown): Rc
The read value of a chart with a density to be determined (known): Ac $$Dn = \log_{10}[1/\{Rr \times (Ac/Ar)\}]$$
$$= \log_{10}(1/Rc)$$

If the density Dn determined in this way is the same in all the nozzle positions, there is no print density unevenness. The determined density, however, may vary due to variations in the properties of the nozzles in the inkjet head. If unevenness is found, the print density unevenness is removed by adjusting the amount of ink so as to reduce the read values in darker portions and increase the read values in lighter portions. A correction method will be explained below in which the print density of a nozzle with a nozzle number n becomes Dcn after correction.

The density Da, which is the average value of the print densities of all the nozzles, is determined. The density Da is calculated by averaging the densities Dn of all the nozzles. After the average value of the print densities of all the nozzles is determined, "Da–Dn" represents the amount of correction for the nozzle with the nozzle number n for printing with the density Da.

When the target density for printing is Dt, the print density Dcn after the correction for the nozzle number n is expressed by the following expression.

$Dcn=Dt+(Da-Dn)\times(Dt/Da)$ [Correction expression 1]

In particular, the density Dt at each image point is determined from image data which is to be printed, the nozzle number n of a nozzle used to print each image point is determined, the print density at each image point is corrected using Correction expression 1 for each nozzle, and the print density Dcn after the correction is determined. A printing of data on the print density after the correction shows an image in which print density unevenness is corrected.

Here, the amount of correction in print density unevenness correction may be calculated using only the highest density of the solid image strip with other densities interpolated as described above. Alternatively, a chart with a plurality of different densities ranging from white to the highest density shown in FIG. 17A is printed, each solid image strip with the corresponding density is read, and the amount of correction for each density is determined, which provides higher accuracy of correction. In this case, the amount of correction for each nozzle is determined from read data on the chart with solid image strips having the plurality of different densities as in the above case, the density which corresponds to the density of each image point is found from the plurality of different densities in the solid chart, and the actual amount of correction is determined by linear interpolation using the amount of correction in the solid density chart with the density higher than and nearest to the density of the image point, the amount of correction for the solid density chart with the density lower than and nearest to the density of the image point, and the density of the point. This method using linear interpolation is commonly known. A "solid density chart" refers to a chart of a solid image strip printed at a particular density. FIG. 17A illustrates four solid density charts with different densities.

In both the method using only one solid density chart with the highest density and the method using solid charts with a plurality of different densities, repeating an operation of "chart printing, reading, and then correction" more than once reduces print density unevenness. In the method using solid charts with a plurality of different densities, print density unevenness can be reduced even if the amount of print ink and the print density are not in a perfect proportional relationship.

[Control of the Amount of Correction According to Noise Level on Printing Paper Sheet]

The process of controlling the amount of correction in print density correction and print density unevenness correction will now be described. Since asperities and surface roughness on the surface of a printing paper sheet, which are not necessarily uniform on the same surface, are present on the entire surface of the printing paper sheet unlike dirt and foreign matter on the surface of a printing paper sheet, equalization is effective in reducing the effects of noise from asperities and surface roughness on the surface of a printing paper sheet.

For this reason, for a printing paper sheet determined to have much noise in "determination of the state of the printing paper sheet" using the first function (i.e., when Yes is selected in Step S22 in FIG. 12), it is preferable that any one of the first to third control methods described below, or any combination thereof be employed.

In the first control method, for both "print density correction" using the second function and "print density unevenness correction" using the third function, the areas or the density chart (FIG. 16) and solid image strips (FIG. 17A) used therefor are increased, thereby increasing the printing areas to be read for equalization.

The second control method uses a standard deviation. For a printing paper sheet determined to have much noise, the standard deviation for pixel values in the read image of each density chart or solid density chart strip is determined based on data read from that density chart or solid image strip. In determination of the average value in the read image of each density chart or the read image of each solid density chart strip, an average value is first calculated based on all the pixels in the target image area. Next, the average value in the read image of each density chart or the read image of each solid density chart strip is recalculated independently of data on the pixels with values that are a given value away from that average value, the given value being obtained by multiplying a standard deviation by a predetermined number or more, e.g., $3\sigma$ or more. Hence, the print density correction or print density unevenness correction is performed using the average value determined independently of (by removal of) pixels with large errors.

In the third control method, data on an image read from an on-paper blank area are subjected to a two dimensional fast Fourier transform to analyze the frequencies of noise components, thereby controlling correction. Here, a two dimensional fast Fourier transform to which images are subjected is commonly well known image processing. See, for example, "C gengo niyoru gazo saikousei nyumon—Fourier henkan no kiso to oyo (introduction to image reconstruction using C language—from basics to advanced level of fast Fourier transform)", Hiroyuki Shinohara et al., published by Iryokagakusha, 2014, for detailed description of this processing. A two dimensional fast Fourier transform corresponds to one mode of "frequency analysis".

In the third control method, an image read from an on-paper blank area is subjected to a two dimensional fast Fourier transform and the results are used for determination of spatial frequency components with large density amplitudes. This two dimensional fast Fourier transform is not necessarily performed at once on the image read from the entire printing paper sheet. As described with reference to FIG. 13, the image data obtained by reading a blank sheet has a very large pixel count. Since a two dimensional fast Fourier transform is a time-consuming computing process, an image read from a printing paper sheet should be divided into a plurality of 1024 pixel long×1024 pixel wide areas individually subjected to two dimensional fast Fourier transform. Naturally, to simplify the computing, the results of a two dimensional fast Fourier transform performed on part of the printing paper sheet may be used. In reality, there is no large difference in the results of a two dimensional fast Fourier transform between portions on a blank area of the surface of one printing paper sheet.

Meanwhile, for correction or detection related to the second to fifth functions which treats unevenness due to a blank area, the spatial frequency of harmful unevenness varies from one function to another.

For "print density correction" using the second function, "print density unevenness correction" using the third function, "ejection state detection and ejection failure correction" using the fourth function, and "print failure determination and failure correction" using the fifth function, the spatial frequency of harmful unevenness is as described below. The above-described process of controlling the amount of correction is performed considering the spatial frequency at which individual corrections are affected, in order to reduce the effects of noise. It should be noted that the inverse of the spatial frequency of unevenness is the wavelength of the unevenness.

In "print density correction" using the second function, values read from the density measurement area are equalized, which results in a large amplitude. Here, unevenness is harmful unless their wavelengths are (1/natural number) of the size of a density measurement area in a measurement density chart which is to undergo equalization. This is because, in this state, the area to undergo equalization includes only part of periodic noise, and equalization cannot completely cancel out the unevenness with that frequency. However, in practical use, measurement errors at a certain level are allowable and the wavelengths can therefore deviate from (1/natural number) of the size of the density measurement area. Besides, as (1/natural number) of the size of the density measurement area decreases, the wavelength of each unevenness decreases with respect to the size of the density measurement area in the chart, causing a relative decrease in the effects of noise. In this example, unevenness with a wavelength or spatial frequency of larger than ½ of the size of the density measurement area in the measurement chart (loose unevenness) results in large errors even after equalization.

"Print density unevenness correction" using the third function mainly corrects unevenness due to variations in ejection characteristics in the inkjet head. Although any unevenness extending in the longitudinal direction of the inkjet head (the nozzle width direction orthogonal to the paper sheet transport direction) is harmful independently of its spatial frequency here, unevenness with a wavelength in a range of 0.5 mm to 2 mm on a printing paper sheet is particularly harmful because of the characteristics of human eyes. The further from this range, the less the adverse effects. It should be noted that unevenness extending in a direction orthogonal to the longitudinal direction of the inkjet head (paper sheet transport direction) is as described in "print density correction". This is because "print density unevenness correction" gives equalization in a direction orthogonal to the longitudinal direction of the inkjet head.

In "ejection failure correction with detection of the head ejection state" using the fourth function, unevenness with a wavelength smaller than a value obtained by multiplying an interval between nozzles in the inkjet head by 20 (fine unevenness) is harmful. This is because computing for detecting the ejection state executed in the inkjet printer 10 according to this embodiment involves filtering such that loose variations in wavelength resulting from 20 or more nozzles are removed. Therefore, in correction computing that involves such filtering, unevenness with a wavelength shorter than the wavelength in the filtering is harmful.

In "failure determination and failure correction achieved by reading the printing results in each printing data" using the fifth function, unevenness with any spatial frequency is harmful.

For this reason, when unevenness with spatial frequency components having large density amplitudes determined by a two dimensional fast Fourier transform of the image read from an on-paper blank area is in a spatial frequency range that tends to be harmful to the above-described corrections, the above-described process of controlling the amount of correction is performed to reduce the effects of noise.

[Method of Determining Printing State by Using Data on Image Read from Printed Area and Control Method Thereof]

Examples of a method of detecting noise caused by printing paper sheets using data on the image read from a printed area, which can be used instead of a method in which data on the image read from a blank image is used, and the control method thereof ([1] to [3]) will now be described.

[1] A method of controlling noise quantification and correction by using read data on test charts in "print density correction" using the second function and "print density unevenness correction" using the third function will be described.

As described above, these two corrections involve reading a predetermined area on a printing where ink droplets are placed and using the average value therein to determine the amount of correction. In the above example, in which the results in "determination of the state of the printing paper sheet" using the first function are used for control of the amount of correction, read data on the test chart for "print density correction" using the second function and/or read data on the test chart for "print density unevenness correc-tion" using the third function also provides information used for control of the amount of correction.

These two corrections are different from "determination of the state of the printing paper sheet" using the first function in that they acquire a read image with ink droplets placed on the paper surface and thus can detect a difference between the characteristics of printing paper sheets in a dry fusion step in which printing paper sheets absorb ink. In particular, printing paper sheets classified into high-quality paper, for example, absorb ink quickly and fix the ink at a deeper point inside the printing paper sheet, which tends to decrease color reproduction density. Besides, there is unevenness in ink absorption due to unevenness in paper-making on the same printing paper sheet of this type, which tends to cause unevenness in color reproduction density. This phenomenon occurs independently of print density. An example of noise from such unevenness is shown in FIG. 17B.

In FIG. 17B, the intensity of the unevenness is increased by 10 times by image processing for easy recognition of noise. FIG. 17B is a diagram in which the unevenness is emphasized by subjecting the image read from a printing with the chart in FIG. 17A to image processing.

To analyze noise from printing paper sheets from an image read from a printed area, noise generated by a combination of (interaction between) print paper sheets and ink is analyzed. To achieve this, a print density correction chart and a print density unevenness correction chart are printed on an actual printing paper sheet and a plurality of density charts is read. The read image is then analyzed and each density chart is subjected to the same process as "determination of the state of the printing paper sheet" using the first function.

Unlike the above-described "determination of the state of the printing paper sheet" using the first function, this chart is made of ink droplets on the printing paper sheet and is affected by variations in the properties of the nozzles. For this reason, to "determine an average read value and check the number of pixels the absolute values of which extremely away from the average value", the settings are changed so that the average value can be calculated for not the entire solid chart but the areas printed with the individual nozzles.

In this embodiment, in which the print resolution of the inkjet head 72 and the reading resolution of the inline sensor 90 are not equal, an average read value is determined each time the color CCD linear image sensor 110 reads the pixels in the paper sheet transport direction to check the number of pixels the absolute values of which are extremely away from the average value of each pixel. Afterwards, the results of "the number of pixels the absolute values of which extremely away from the average value" obtained by reading all the pixels with the color CCD linear image sensor 110 are summed. This allows the number of noise pixels and the density to be determined independently of the effects of variations in the properties of the nozzles. The results are used for control of the processes using the second to fifth functions. The control method in which the processes using the second to fifth functions are controlled according to the results of noise detection is as in the above-described "determination of the state of the printing paper sheet" using the first function.

In addition, a process using data on a plurality of density charts is performed in which the numbers of noise pixels and densities in charts with different densities are compared to check if an excessive number of noise pixels exist on a chart with a particular density. If the chart with the particular density has a higher level of noise than the charts with the adjacent densities, there is a possibility that fine density unevenness is present due to imbalances in the spatial distribution of the amount of ink on the paper surface which are caused by increased droplet interaction between ink droplets on the respective pixels ejected from the inkjet head, which phenomenon is related to the amount of ink on local areas, the ink absorption of the paper sheet, and the surface energy of the paper sheet.

This density unevenness sometimes shows up in the form of grain. When such a state occurs at a particular density, print density unevenness correction using a chart with a density near that particular density during "print density unevenness correction" using the third function is prone to errors. When unevenness due to droplet interaction occurs, the following control is executed during print density unevenness correction using a density chart which is either a correction chart with a density near that particular density or a solid image strip with the highest density.

Four control methods (the fourth to seventh control methods) will now be described as specific examples of the control method.

[Fourth Control Method]

In one control method (the fourth control method), an image read from a density chart with the target density undergoes a low-pass filter that reduces fine density unevenness (smoothing filter), followed by calculation for density unevenness correction. Gaussian filters are well known filters although various low-pass filters can be used here. Gaussian filters barely cause spurious resolution and are thus suitable for the process according to this embodiment.

Although a Gaussian filter for an area of 3×3 pixels is shown below, a Gaussian filter for a larger area of, for example, 5×5 pixels may be alternatively used according to the size of the above-described density unevenness due to droplet interaction. The size of the filter is determined such that it is larger than the size of the density unevenness due to droplet interaction on the read image. In this embodiment, the size of the density unevenness due to droplet interaction is larger than that of three pixels which is determined from the print resolution of the inkjet printer 10, specifically, greater than or equal to 63.5 μm at a print resolution of 1200 dpi, for example. The unit "dpi", which refers to dot per inch, represents the number of dots per inch. One inch is 25.4 mm. Since the reading resolution in this example is 600 dpi and each pixel in the read image has a size of about 42 μm, a reading operation requires two or more pixels. Given that the required filter size is 3×3 pixels or more, a 3×3 filter was used. An example of a 3×3 Gaussian filter used is shown below.

$$\begin{pmatrix} 1/16 & 2/16 & 1/16 \\ 2/16 & 4/16 & 2/16 \\ 1/16 & 2/16 & 1/16 \end{pmatrix}$$

A median filter can be used instead of a Gaussian filter. In a 3×3 median filter, data of nine pixels which are the pixel of interest and the neighboring eight pixels are arranged in ascending order and a filtered median value (corresponding to the fifth largest value in a 3×3 filter) is determined. A median filter leads to less image blur and reduces random noise.

In this example, "print density correction" using the second function used a median filter, while "print density unevenness correction" using the third function used a Gaussian filter for low-pass filter processing. These filters are commonly well known image processing methods. A Gaussian filter is one type of a smoothing filter and each value shown in [Formula 1] is substituted into the smoothing filter operator. See, for example, "Digital gazo shori nyumon—Visual Basic & Visual C++ niyoru (introduction to digital image processing—by use of Visual Basic & Visual C++)", Koichi Sakai, published by CQ Publishing Co., Ltd., 2002, for detailed description of this processing.

After data on the read image undergoes such a low-pass filter, the density corresponding to each nozzle position is determined. This reduces the effects of unevenness due to droplet interaction.

Figure 18:
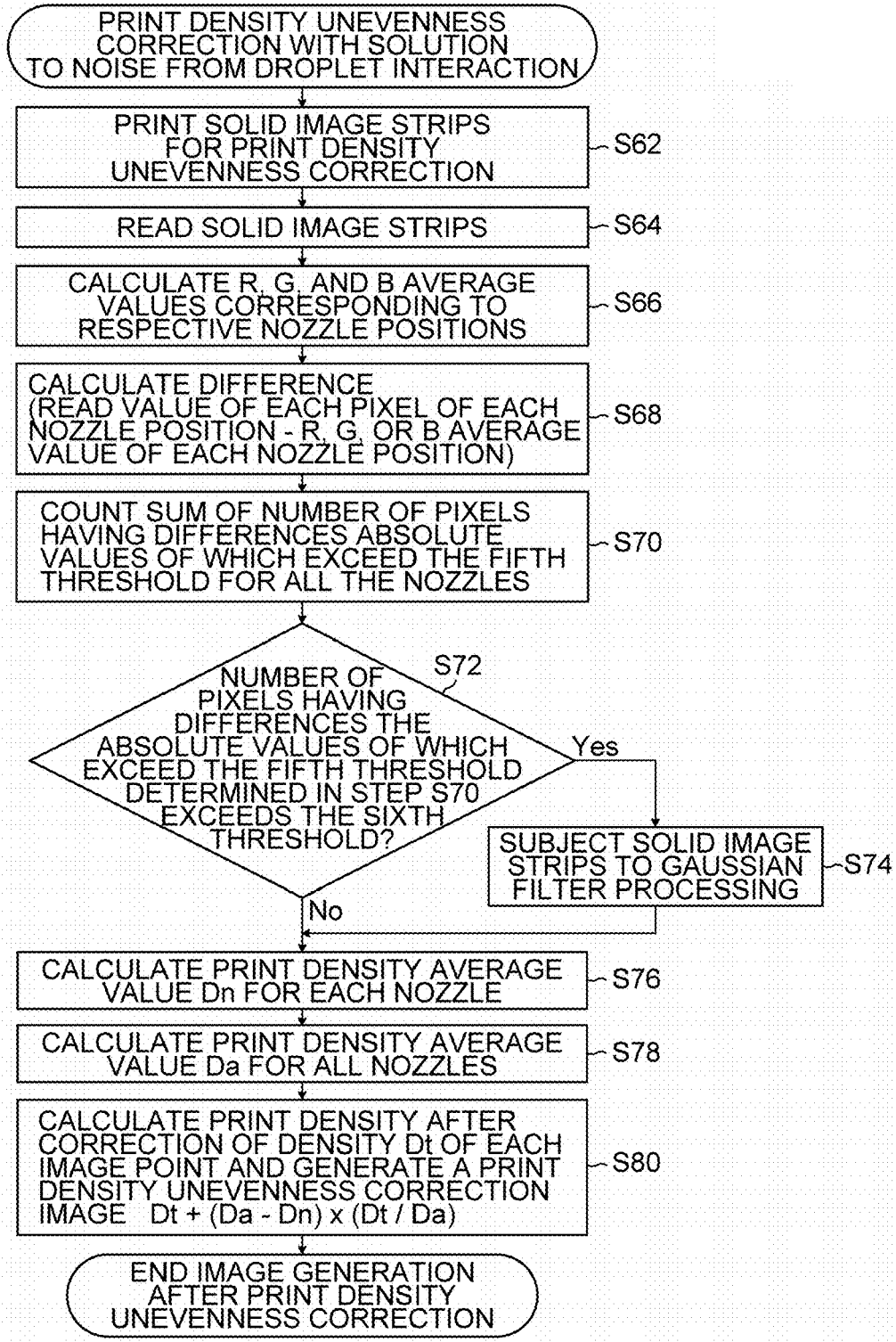
FIG. 18 illustrates a flow chart of a control operation for print density unevenness correction which involves a process of analyzing noise from an image read from a printed area and utilization of the results of this process.

FIG. 18 illustrates a flow chart of a control operation for "print density unevenness correction" using the third function, which involves a process of analyzing noise from an image read from a printed area and utilization of the results of this process.

The flow chart of FIG. 18 shows print density unevenness correction for noise from droplet interaction. First, solid image strips for print density unevenness correction is printed (Step S62). In Step S62, the print density unevenness correction chart pattern 146 in FIG. 14 and the chart pattern of solid image strips in FIG. 17 are printed.

Subsequently, the printed solid image strips are read to acquire data on the read image (Step S64). R, G, and B average values corresponding to the respective nozzle positions are calculated (Step S66) for each solid strip image of the same density, from the data on the read image acquired in Step S64. The R, G, and B average values calculated here correspond to one mode of the "average same density image read value".

In the subsequent Step S68, for each solid strip image of the same density, R, G, and B average values corresponding to the respective nozzle positions are subtracted from the read values of the pixels corresponding to the respective nozzle positions to determine differences therebetween.

Then, the sum of the number of pixels having differences determined in Step S68, the absolute values of which exceed the fifth threshold among the pixels corresponding to all the nozzles is determined (Step S70). The fifth threshold is a threshold of the absolute value of a difference calculated in Step S68. The fifth threshold is a threshold corresponding to the first threshold described with reference to FIG. 12. Pixels having differences the absolute values of which exceed the fifth threshold correspond to "abnormal noise" on the surface of a printing paper sheet. It should be noted that noise from droplet interaction tends to distribute more on a side brighter than R, G, and B average values.

Subsequently, whether "the number of pixels having differences the absolute values of which exceed the fifth threshold" determined in Step S70 exceeds the sixth threshold is determined (Step S72). The sixth threshold is a threshold of a pixel count for determination of noise level. The sixth threshold is a threshold corresponding to the second threshold described with reference to FIG. 12. It should be noted that the determination in Step S72 does not necessarily use a threshold of pixel count (the sixth threshold) and may alternatively use the proportion pixels having the abnormal noise (percentage). For example, a threshold (the seventh threshold) related to the proportion of pixels having the abnormal noise is predetermined, and when the proportion of pixels having the abnormal noise exceeds the seventh threshold, it may be determined that there is much noise.

If Yes is selected in the determination in Step S72, the process proceeds to Step S74. In Step S74, the solid image strips read in Step S64 are subjected to Gaussian filter processing. After the Gaussian filter processing in Step S74, the process proceeds to Step S76.

In contrast, if No is selected in the determination in Step S72, the process proceeds to Step S76 without executing the processing in Step S74. It should be noted that solid strip images of the same densities may be separately subjected to processing in Steps S70, S72, and S74.

In Step S76, a print density average value (density Dn) for each nozzle is calculated. In the subsequent Step S78, a print density average value (density Da) for all the nozzles is calculated. Afterwards, a print density Dcn after correction of the density Dt of each image point is calculated, thereby generating a print density unevenness correction image to be printed in an image printing area on a second printing (Step S80). It should be noted that more accurate print density unevenness correction is achieved by repetition of the flow in FIG. 18 which involves generating the print density unevenness correction image of the solid image strips for print density unevenness correction in Step S80 and printing this image in Step S62. In this embodiment, accurate results were obtained by repeating the flow twice to three times.

In the flow chart of FIG. 18, changing determination of whether the processing in Step S74 is carried out according to the results of the determination in Step S72 changes a computing operation for print density unevenness correction. This changes the calculation results of the amount of correction. The flow chart of FIG. 18 can reduce the effects of noise from droplet interaction and noise from printing paper sheets, thereby accomplishing accurate print density unevenness correction.

Like the first threshold described with reference to FIG. 12, the fifth threshold in FIG. 18 may be defined as a multiple of a standard deviation of read values in an image of the same density.

[Fifth Control Method]

In another control method (the fifth control method), the amount of correction of density unevenness determined from the read correction chart image of the target density is made smaller than the original value.

To be specific, in "print density unevenness correction" using the third function, the print density in a portion corresponding to each nozzle is determined and a correction value is then determined such that all the amount of density unevenness is removed. In the fifth control method, however, the amount of correction to be applied to actual correction processing is made smaller than the calculated amount of correction in each "chart printing, reading, and then correction" operation. In particular, it is made, for example, ½ of the determined amount of correction. This is expressed in the following expression.

Original print density after correction=$Dt+(Dt/Da)\times(Da-Dn)$

Print density after correction using the fifth control method=$Dt+(Dt/Da)\times(Da-Dn)/2$ As is obvious from this, the control of the amount of correction is necessary because density unevenness due to droplet interaction becomes noise, which increases errors in density measurement values, and use of the determined amount of correction as it is as a correction value may therefore cause the print density unevenness correction to fluctuate and not converge. Repeating an operation of "chart printing, reading, and then correction" several times by using the fifth control method stabilizes and converge the results of print density unevenness correction.

[Sixth Control Method]

In still another control method (the sixth control method), if such density unevenness due to droplet interaction is detected, the length of a chart pattern with the corresponding density, which is intended for use in print density unevenness correction, in the paper sheet transport direction is made longer in the subsequent printing operations. Reading of this extended chart pattern with a larger area and equalization with a larger number of pixels allow "print density unevenness correction" using the third function to be performed with reduced effects of noise.

[Seventh Control Method]

In yet another control method (the seventh control method), if such density unevenness due to droplet interaction is detected, "print density unevenness correction" using the third function is performed by repeating an operation of "chart printing, reading, and then correction" a larger number of times than in a standard condition (normal condition). In a standard condition, an operation of "chart printing, reading, and then correction" is normally repeated at least twice, for example, and if density unevenness due to droplet interaction is detected, control is provided such that an operation of "chart printing, reading, and then correction" is repeated at least three times.

The four control methods described above, i.e., the fourth to seventh control methods may be used in an appropriate combination.

[2] A control method for quantification and correction based on read data in "ejection failure correction with detection of the head ejection state" using the fourth function will now be explained.

In "ejection failure correction with detection of the head ejection state" using the fourth function, a test chart in the form shown in FIG. 15 is printed, the lines printed with the nozzles are read with the inline sensor 90, and errors in the positions of the lines are measured. Errors in the positions of the lines represent ejection position errors in the nozzles. If the position of a line deviates by a predetermined amount or more, "ejection failure correction" is performed by not using the corresponding nozzle and increasing the amount of ink ejected from the neighboring nozzles to compensate it.

Figure 19A:
FIG. 19A is a schematic enlarged view of a normal line on a chart pattern for ejection failure detection.
Figure 19B:
FIG. 19B is a schematic enlarged view of a line on the pattern deformed by the effects of asperities on the printing paper sheet.

Here, the lines curve in a unique way depending on the state of the surface of the printing paper sheet, especially with many asperities on the surface. FIG. 19A is a schematic enlarged view of a normal line, and FIG. 19B is a schematic enlarged view of a line deformed by the effects of asperities on the printing paper sheet. As shown in FIG. 19B, a single line that curves in the middle and returns to a normal position may have been affected by asperities on the printing paper sheet. Naturally, the curved line in FIG. 19B can be printed due to the unstable ejection state of the inkjet head, although, in general, the frequency of this phenomenon is probably low.

With the effects of asperities on the printing paper sheet, a test chart printed in the form shown in FIG. 15 exhibits many lines in the pattern shown in FIG. 19B because asperities are present on the entire surface of the printing paper sheet. The degree of asperities on the surface of the printing paper sheet used can be estimated by revealing the proportion of lines in such a form that the line segment curves in the middle and then returns to the original state shown in FIG. 19B by analyzing the shape (pattern) of each line in an image read from the test chart in the form in FIG. 15.

In this embodiment, when the number of nozzles that produce lines with a partial curve in the form shown in FIG. 19B exceeds a predetermined value (e.g., 50), it is determined the degree of asperities on the printing paper sheet is high and affects "head ejection state detection". The predetermined value is a threshold for determining the noise level and corresponds to one mode of the "first threshold". This threshold (predetermined value) can be set to an appropriate value according to the properties of the inkjet printer and the type of correction used. When the degree of asperities on the printing paper sheet is as low as negligible, lines in the form shown in FIG. 19B are usually produced by several or less nozzles per inkjet head.

For this reason, there is a possibility of the abnormal state of the inkjet head when a phenomenon in which the number of nozzles that produce lines in the form shown in FIG. 19B exceeds 50 is defined on a particular printing paper sheet known as having an as low as negligible degree of asperities thereon. In this case, cleaning of the inkjet head or other maintenance is preferably performed.

If it is determined the number of nozzles that produce lines in the pattern shown in FIG. 19B exceeds a predetermined value which phenomenon affects "head ejection state detection", from a printed test chart for detecting the ejection states of the nozzles in the form shown in FIG. 15, the same solution as in the method described with reference to FIG. 12 is used. To be specific, a line chart pattern used to determine nozzles with ejection failures, for example, is extended in the paper sheet transport direction. This reduces the effects of noise. Alternatively, the same chart pattern is printed on one printed paper sheet a plurality of times or the same chart pattern is printed on a plurality of printing paper sheets.

In addition to change of the test chart printing conditions, the conditions of ejection failure determination algorithm and/or the ejection failure determination (detection) conditions are changed. In particular, as described for Steps S28 and S30 in FIG. 12, the combination of a determination algorithm of cumulative sum detection or continuous detection and the setting related to a detection count threshold is changed.

Unique curves in the lines in a chart pattern due to asperities on the printing paper sheet have been described here, although local density fluctuations in the lines and ink smearing into paper fiber may also be caused depending on the type of printing paper sheet. These phenomena, which also affect the measurement of ejection position errors, are preferably treated like curves in the lines, i.e., determined to affect "head ejection state detection" and processed by control of the number of ejection failed nozzles and other steps described above.

[3] A control method for quantification and correction based on read data in "print failure determination and failure correction achieved by reading the printing results in each printing data" using the fifth function will now be described.

A method of "print failure determination achieved by reading the printing results in each printing data" using the fifth function is as already described in "a method of controlling inkjet printing according to the second embodiment", although the fifth function determines that there is a print failure when a difference detected from a difference image, which indicates a difference between data, exceeds a predetermined density difference, or when the area (size) of a portion exceeding the predetermined density difference exceeds a predetermined area.

The fifth function compares original image data that has been used in printing or read data on a normal printing resulting from, for example, test printing with read data on each printing by calculating a difference between these images and uses the difference image for checking defects.

Characteristics detected from a difference image are, for example, print density and color differences. Other characteristics detected from a difference image are, for example, density unevenness and/or color unevenness in the form of streaks extending parallel with the paper sheet transport direction.

Naturally, differences as small as negligible as print failure are present on each printing. Differences as small as negligible as print failure are sometimes generated under the influence of a difference in the state of the surface of the printing paper sheet or droplet interaction described above. For this reason, the state of the surface of the printing paper sheet and the state of ink droplet interaction are detected from information on a difference image.

Here, a "difference image" is a difference between the pixel values of a pixel in one image and the corresponding pixel in the other image. The obtained difference image corresponds to image data having the same size as that of an image read from the printing. Hence, a portion of the image which has a predetermined density or more and is relatively uniformly solid (a solid area that can be defined as a uniform density area) is detected from the original image, and a predetermined pixel count size (e.g., 256 pixels×256 pixels) is extracted from the corresponding portion in the difference image and subjected to two dimensional fast Fourier transform. A predetermined pixel count size of image area extracted from the difference image corresponds to a "solid image serving as a uniform density area".

Meanwhile, a solid image of a predetermined density or more is printed on a standard printing paper sheet and an image read from that printing (hereinafter referred to as "standard paper printing") is subjected to a two dimensional fast Fourier transform to frequency characteristics of the solid image at each density are determined in advance.

The results of a two dimensional fast Fourier transform for an image read from an actual printing is compared with the results of a two dimensional fast Fourier transform performed in advance for the printed standard paper to determine a difference therebetween. Noise here is mainly defined as asperities, surface roughness, ink density unevenness due to droplet interaction, and a grainy texture on the surface of a printing paper sheet. Therefore, when a comparison between the results of a two dimensional fast Fourier transform shows a difference between the intensities of wavelength (frequency) components of a wavelength ranging from double the print pixel size, which is determined by a print resolution, to 2 mm, for example, when one intensity is twice the other, the printing paper sheet is determined to have much noise and the control method is changed as described for the different corrections.

When differences in color density and color is detected from a difference image and presence of strong noise is determined for a particular print density and color, the settings related to print density correction for the corresponding print density and color range are changed in print density correction processing to reduce the effects of noise.

These various methods described above are used to detect the states of printing paper sheets. In each method, the correction method or detection method is appropriately changed for printing.

In addition, in the inkjet printer 10 according to this embodiment, when much abnormal noise is detected on a printing paper sheet, the user (operator) of the inkjet printer 10 receives notification about much abnormal noise. This notification is done through information display on the display 230 (see FIG. 3). The display 230 displays information on the state of abnormal noise. For example, the notification includes at least one of the following information: the type, occurrence frequency, and frequency of the abnormal noise, and imbalances in the distribution of the abnormal noise on the paper sheet. It is preferable that the notification also includes information on a recommended operation method and/or recommended setting method for performing, for example, threshold relaxation or condition change in correction processing. When a printing paper sheet has an extreme degree of abnormal noise and is translucent, for example, the operator is notified that "ejection failure correction with detection of the head ejection state" using the fourth function should not be performed. Naturally, if "ejection failure correction with detection of the head ejection state" using the fourth function is performed in such printing conditions, the function of this embodiment provides control such that the threshold is relaxed.

[Modification]

Although a correction method for use in ejection failure correction has been described in which an ejection failed nozzle is non-used and printing is performed with another substitute nozzle, another method can be used instead in which an ejection failed nozzle is not completely non-used and the usage rate of the ejection failed nozzle is reduced. In the case where an ejection failed nozzle is used with a reduced usage rate, a parameter that determines the usage rate corresponds to "the amount of correction" in correction processing. The usage rate of an ejection failed nozzle can be changed according to the state of abnormal noise revealed by the first function.

[Combination of Control Methods and Other Functions]

The various control methods described in the above embodiment and the functions explained in Modification and other descriptions may be used in an appropriate combination or partly substituted by another function.

[Transport Device for Printing Paper Sheets]

A transport device for transporting printing paper sheets 24 is not limited to a transporting drum illustrated in FIG. 1, and may be in any form such as a transporting belt, a transporting nipper, a transporting chain, a transporting palette, or any appropriate combination thereof.

[Printing Paper Sheet]

The term "printing paper sheet" refers to "medium" in printing. The term "printing paper sheet" is synonymous with recording paper sheet, printing medium, recording medium, target printing medium, target recording medium, image forming medium, target image forming medium, image receiving medium, target ejection medium, or other terms. There is no particular limitation on the material and shape of a printing paper sheet. A printing paper sheet may be paper, a resin sheet, a film, a cloth, a nonwoven fabric, and other materials and in the form of a continuous sheet of paper, a cut-sheet paper, a sticker paper sheet, or other forms.

The term "image" is used in a broad sense and includes color image, black and white image, single color image, gradational image, and uniform density (solid) image. An "image" is not necessarily a photographic image and is an inclusive term including a pattern, text, a symbol, a line, a mosaic pattern, a pattern with different colors, other patterns, and any appropriate combination thereof. The term "Printing" includes typing, image recording, image formation, drawing, and print.

The term "printer" is synonymous with printing machine, image recording device, drawing device, and imaging device.

[Ejection Scheme]

An ejector in the inkjet head includes nozzles that eject liquid droplets, a pressure chamber in communication with the nozzles, and an ejection energy generating element that gives ejection energy to the liquid in the pressure chamber. As for an ejection scheme for forcing liquid droplets out of the nozzles of the ejector, the device for generating ejection energy is not necessarily a piezoelectric element and may be a heating element, an electrostatic actuator, or other ejection energy generating elements. For example, a scheme may be used in which liquid droplets are ejected by the pressure generated by film boiling of a heating element in which liquid is heated. An appropriate ejection energy generating element selected according to the ejection scheme for the liquid ejection head is provided to the channel structure.

Various modifications, additions, and deletions can be made to the above embodiments of the present invention without departing from the spirit of the invention. The invention is not limited to the above embodiments and many modifications can be made by those skilled in the art without departing from the technical idea of the invention.

What is claimed is:

1. An inkjet printer comprising:
   an optical reading device that optically reads a blank area which is an unprinted area on a printing paper sheet and acquires image data on the blank area;
   an abnormal noise detecting device that:
   analyzes the image data acquired by the optical reading device and detects abnormal noise on a surface of a printing paper sheet,
   determines a blank-read average value that is an average value of read values of pixels on the blank area, and
   detects, as a pixel having the abnormal noise, a pixel having a read value where an absolute value of a difference between the read value and the blank-read average value exceeds a first threshold; and
   a control device that:
   changes at least a setting related to detection of an ejection state of an inkjet head or a printing state, or a setting related to printing correction, based on a state of the abnormal noise detected by the abnormal noise detecting device, and
   controls printing based on at least the setting that was changed.

2. The inkjet printer according to claim 1, wherein the setting related to detection includes at least one of the settings of test chart printing conditions, a detection algorithm, and a detection threshold.

3. The inkjet printer according to claim 1, wherein the printing correction includes at least one of print density correction, print density unevenness correction, and ejection failure correction.

4. The inkjet printer according to claim 1, wherein the setting related to printing correction includes at least one of settings of an amount of correction in correction processing, correction conditions, a threshold for correction, and a correction algorithm.

5. The inkjet printer according to claim 1, wherein the abnormal noise is noise from at least one of asperities, foreign matter, surface roughness, and dirt on the surface of the printing paper sheet, non-uniformity in a thickness of the printing paper sheet, non-uniformity in paper fiber, and ink droplet interaction.

6. The inkjet printer according to claim 1, wherein
the first threshold is determined by a standard deviation of blank area read values.

7. The inkjet printer according to claim 1, wherein the control device performs computing for correction by removing pixels having the abnormal noise from read data acquired by the optical reading device, during correction processing in the printing correction.

8. The inkjet printer according to claim 1, wherein the first printing includes the unprinted area, and reading of the unprinted area and the test chart printed area is done by reading the first printing once.

9. The inkjet printer according to claim 1, wherein the optical reading device reads the test chart printed area on the first printing and acquires read data on the test chart.

10. The inkjet printer according to claim 9, wherein the abnormal noise detecting device determines an average same density image read value that is an average value of read values in an image of the same density area of the test chart, based on read data on the test chart and detects, as a pixel having the abnormal noise, a read pixel exhibiting a difference between the read value in the image of the same density area and the average same density image read value, the difference having an absolute value exceeding a fifth threshold.

11. The inkjet printer according to claim 10, wherein the state of abnormal noise includes at least one of a number of pixels having the abnormal noise and a proportion of pixels having the abnormal noise, and
when the number of pixels having the abnormal noise exceeds a sixth threshold or when the proportion of pixels having the abnormal noise exceeds a seventh threshold, at least one of the setting related to detection and the setting related to printing correction is changed.

12. The inkjet printer according to claim 10, wherein the fifth threshold is determined by a standard deviation of read values in the image of the same density area of the test chart.

13. The inkjet printer according to claim 9, wherein
the first printing on which an ejection failure detection test chart is printed is read by the optical reading device,
the abnormal noise detecting device detects the abnormal noise from a pattern of the ejection failure detection test chart, and
the control device changes at least one of an amount of correction, correction conditions, a threshold, a correction algorithm, the number of test chart printing operations, and the ejection failure detection test chart during correction processing in ejection failure correction, based on the state of abnormal noise detected by the abnormal noise detecting device.

14. The inkjet printer according to claim 1, wherein
the optical reading device reads the image printed area on the second printing and acquires read data on an image printed on the second printing, and
the abnormal noise detecting device detects the abnormal noise by extracting a solid area of a uniform density from read data on the printed image acquired by reading of the second printing, and analyzing the frequency of the solid area.

15. The inkjet printer according to claim 1, further comprising at least one correction device selected from a group consisting of a print density correcting device that performs processing in print density correction, and a print density unevenness correcting device that performs processing in print density unevenness correction,
wherein the correction device performs correction such that at least one read data related to the correction device, selected from the group consisting of read data on a print density correction test chart and read data on a print density unevenness correction test chart is subjected to a low-pass filter by changing the setting related to printing correction according to the state of abnormal noise.

16. The inkjet printer according to claim 1, further comprising an ejection failure correcting device that performs ejection failure correction,
wherein a current determination method is changed, by changing the setting related to printing correction according to the state of abnormal noise, to at least one determination method selected from a group consisting of relaxing a failure determining threshold of an ejection position error, determining an ejection failure from a plurality of cumulative sum detections, and determining an ejection failure from a plurality of continuous detections.

17. The inkjet printer according to claim 1, wherein
the optical reading device reads the second printing on which an image other than a test chart and based on image data designated to be printed is printed and acquires read data on the image printed on the second printing, and
the abnormal noise detecting device detects the abnormal noise by calculating a difference between read data read from the second printing and the image data designated to be printed and analyzing the frequency of a difference image.

18. The inkjet printer according to claim 17, wherein
characteristics detected from the difference image are differences in print density and color, and
the control device changes settings related to print density correction for target ranges of print density and color, according to the state of abnormal noise detected by the abnormal noise detecting device.

19. The inkjet printer according to claim 17, wherein characteristics detected from the difference image are density unevenness and/or color unevenness in a form of streaks extending parallel with a paper sheet transport direction.

20. The inkjet printer according to claim 1, further comprising an information notification device that notifies a user of information on the state of abnormal noise detected by the abnormal noise detecting device.

21. The inkjet printer according to claim 20, wherein the information on the state of abnormal noise includes at least one type of information selected from a group consisting of noise level, abnormality type, frequency, spatial frequency, and imbalances in distribution.

22. The inkjet printer according to claim 21, wherein the notification includes at least a recommended operation method or recommended setting method for correction processing.

23. The inkjet printer according to claim 1, wherein
the state of abnormal noise includes a number of pixels having the abnormal noise and when the number of pixels having the abnormal noise exceeds a second threshold, at least one of the setting related to detection and the setting related to printing correction is changed.

24. The inkjet printer according to claim 23, wherein
the state of abnormal noise includes a density level of pixels having the abnormal noise, and when the density level of pixels having the abnormal noise exceeds a fourth threshold, at least one of the setting related to detection and the setting related to printing correction is changed.

25. The inkjet printer according to claim 1, wherein
the state of abnormal noise includes a proportion of pixels having the abnormal noise, and when the proportion of pixels having the abnormal noise exceeds a third threshold, at least one of the setting related to detection and the setting related to printing correction is changed.

26. The inkjet printer according to claim 25, wherein the state of abnormal noise includes a density level of pixels having the abnormal noise, and when the density level of pixels having the abnormal noise exceeds a fourth threshold, at least one of the setting related to detection and the setting related to printing correction is changed.

27. A method of controlling inkjet printing, comprising:
an optical reading step of optically reading a blank area which is an unprinted area on a printing paper sheet and acquiring image data on the blank area;
an abnormal noise detecting step of:
  analyzing the image data acquired in the optical reading step and detecting abnormal noise on a surface of a printing paper sheet,
  determining a blank-read average value that is an average value of read values of pixels on the blank area, and
  detecting, as a pixel having the abnormal noise, a pixel having a read value where an absolute value of a difference between the read value and the blank-read average value exceeds a first threshold; and
a control step of:
  changing at least a setting related to detection of an ejection state of an inkjet head or a printing state, or a setting related to printing correction, based on a state of the abnormal noise detected in the abnormal noise detecting step, and
  controlling printing based on at least the setting that was changed.

* * * * *